(12) United States Patent
Kirby et al.

(10) Patent No.: US 9,311,651 B2
(45) Date of Patent: Apr. 12, 2016

(54) IDENTITY-MEDIA MEASUREMENT MODEL (IMMM)

(71) Applicant: Cable Television Laboratories, Inc., Louisville, CO (US)

(72) Inventors: Josiah J. Kirby, Golden, CO (US); Dan Lavender, Littleton, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 14/050,425

(22) Filed: Oct. 10, 2013

(65) Prior Publication Data

US 2014/0259044 A1    Sep. 11, 2014

Related U.S. Application Data

(60) Provisional application No. 61/774,254, filed on Mar. 7, 2013.

(51) Int. Cl.
| | |
|---|---|
| *H04N 21/266* | (2011.01) |
| *H04N 21/4185* | (2011.01) |
| *H04N 21/43* | (2011.01) |
| *G06Q 30/02* | (2012.01) |
| *H04N 21/254* | (2011.01) |
| *H04N 21/478* | (2011.01) |
| *H04N 21/4784* | (2011.01) |
| *H04N 21/81* | (2011.01) |

(52) U.S. Cl.
CPC ....... *G06Q 30/0207* (2013.01); *H04N 21/2542* (2013.01); *H04N 21/4784* (2013.01); *H04N 21/47815* (2013.01); *H04N 21/812* (2013.01)

(58) Field of Classification Search
None
See application file for complete search history.

(56) References Cited

U.S. PATENT DOCUMENTS

| | | | | |
|---|---|---|---|---|
| 2002/0198905 | A1* | 12/2002 | Tabatabai | H04N 21/23412 715/201 |
| 2003/0018969 | A1* | 1/2003 | Humpleman | G06Q 30/0225 725/34 |
| 2003/0191685 | A1* | 10/2003 | Reese | G06F 17/30867 705/14.67 |
| 2006/0179006 | A1* | 8/2006 | Humpleman | G06Q 20/382 705/64 |
| 2010/0217660 | A1* | 8/2010 | Biswas | 705/14.38 |
| 2012/0324501 | A1* | 12/2012 | Klein | H04N 21/4784 725/23 |
| 2015/0020096 | A1* | 1/2015 | Walker | G06T 11/206 725/34 |

* cited by examiner

*Primary Examiner* — Brian T Pendleton
*Assistant Examiner* — Jean D Saint Cyr
(74) *Attorney, Agent, or Firm* — Great Lakes Intellectual Property, PLLC

(57) ABSTRACT

Identity-Media Measurement Model (IMMM), schema, table, database or other electronically transferable form for reporting, measuring, quantifying or otherwise representing user metrics, values, etc. with respect to advertisements or other electronically interfaced propositions is contemplated. The IMMM may provide a ubiquitous tool for correlating information collected with a Media Event Data Model (MEDM) and a Media Measurement Data Model (MMDM) to represent user activities during media playback.

16 Claims, 9 Drawing Sheets

IDENTITY-MEDIA MEASUREMENT MODEL (IMMM)

CROSS-REFERENCE TO RELATED APPLICATIONS

This application claims the benefit of U.S. provisional Application No. 61/774,254 filed Mar. 7, 2013, the disclosure of which is incorporated in its entirety by reference herein.

TECHNICAL FIELD

The present invention relates to generating schemas, databases, software constructs, tables and other electronic data types in order to facilitate measuring, quantifying, characterizing or otherwise representing user engagement, activities, characteristics or other datum while a user initiates a sync event, such but not necessarily limited to a sync event initiated during playback of media.

BACKGROUND

Electronic media may be delivered and interfaced with a user through an every growing number of devices and formats. Service providers or other entities associated with the source media for consumption in some case receive some form of pecuniary or non-pecuniary compensation from advertisers. The advertisers, for example, desire commercials, coupon offers or other product/vendor propositions to be interfaced to the user during media playback in exchange for the provided compensation. The nature, context, engagement or other representation of the user with respect to an advertisement, etc., can provide valuable insight to advertisers, product proprietors, vendors and the like. Given access to media has almost become ubiquitous, one non-limiting aspect of the present invention contemplates a need to facilitate providing advertisers and the like feedback regarding user engagement, etc. using models, tools, constructs or other electronically permissible forms having capabilities sufficient to facilitate their use and application across disparate content delivery platforms.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
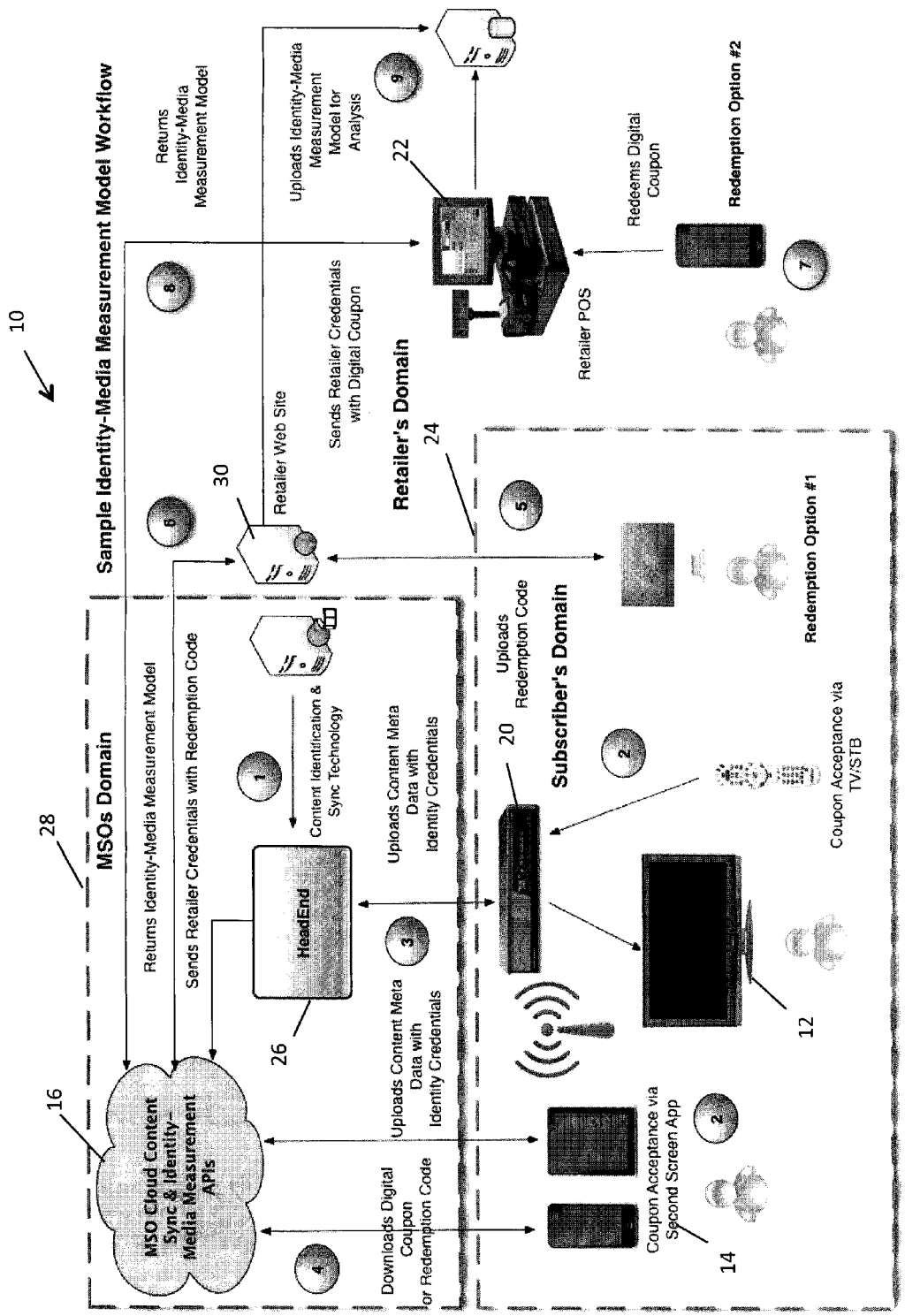
FIG. 1 illustrates an Identity-Media Measurement Model (IMMM) in accordance with one non-limiting aspect of the present invention.

FIG. 1 illustrates an Identity-Media Measurement Model (IMMM) 10 in accordance with one non-limiting aspect of the present invention. The Identity-Media Measurement Model (IMMM) 10 may represent a model of both a user's identity/profile along with the rich metadata associated with streaming content or other media access. The IMMM 10 may be an event driven model in that when content may be synchronized to a specific point in the program, an event such as an advertising promotion, survey, poll, etc. can be presented to the viewer either directly on the TV (e.g., via EBIF) 12 and/or through a companion second screen application 14. One aspect of IMMM 10 may include an underlying common content sync application program interface (API) (CCSA) that can gather both the relevant real-time content metadata (e.g., content ID/EIDR, time codes, etc.) with the identity of the user and post that information to a cloud based Web service 16. This service can process the content and place it into the identity-media measurement repository (model). In addition to capturing the event data, the service can generate redemption implementations such as redemption codes, QR codes, etc. which can be used by the user either through online or in-store retail purchases. The IMMM 10 may provide an interface to retailers who submit the redemptions to receive the rich metadata surrounding the user and the content viewed which triggered the event, for which a multiple system operator (MSO) may collect a fee or some sort of licensing compensation.

The CCSA may be platform independent to allow Web services 16, second screen devices 14, settop boxes (STBs) 20, and any IP device to have a common set of APIs to capture and publish IMMM content. The identity-media measurement API (Web services 16) may be a back office controller operable to provide the interfaces to capture content, and provide rich metadata and services to end users such as retailers 22 and subscribers 24. FIG. 1 shows multiple implementations of IMMM 10, however, the IMMM 10 is not necessarily coupled with any particular technology implementation and it serves to illustrate the value of the model and how it might be used. The model 10 illustrates a first interaction (1) where content may be ingested at a headend 26 using a suitable form or synchronization technique and delivered to an IP endpoint (Connected TV, IP STB, etc.) or other media interfacing device (mobile phone, computer, cellular device, etc.) 12, 14 via a suitable technology, such as but not necessarily limited to IP/QAM signaling, audio/video fingerprinting, watermarking, etc. One non-limiting aspect of the present invention contemplates the headend unit 26 being within a domain 28 or control of the MSO such that the MSO is response for the operation of the media receiving devices 12, 14 or interfacing components within a corresponding subscriber domain 24. Such an MSO may be cable/satellite/broadcast television service provider, an Internet service provider (ISP), a cellular service provider, etc.

Depending upon the technique used in the first interaction, the content could be delivered directly to an IP TV or an IP STB. In the case of the IP TV a companion second screen app built on top, as shown with a second interaction (2), the CCSA could use a technique like audio fingerprinting to capture a sync event. For the IP STB (e.g., Enhanced TV Binary Interchange Format (EBIF), the disclosure of which is hereby incorporated by reference in its entirety, or app built with CCSA, the sync event could be delivered by a technology such as Enhanced Television (ETV) Integrated Signaling Stream (EISS) defined in ETV-AM (Enhanced TV Application Messaging) and U.S. patent application Ser. No. 13/173, 303 or SCTE-35 Markers, the disclosures of which are hereby incorporated by reference in their entireties, to then have an app display an ad with a coupon offering which can be accepted via the STB remote. Once the event information is captured via CCSA, it may be assembled and posted to an IMMM Web Service 16 via either the Internet on the second screen device 14 or through the STB 12 to the headend 26. Upon receipt of the post, the data may be processed and stored in an IMMM repository as shown with a third interaction (3).

The IMMM 10 may provide a mechanism for the subscriber 24 to redeem their coupon as part of a fourth interaction (4). It can be in the form of a redemption code, or a digital format such as a QR code. The subscriber 24 can download one of these to its device, such as a phone 14. A fifth interaction (5) describes a possible redemption for an online retailer 30. Once the subscriber 24 has their redemption code they can go online to the retailer web site 30 to purchase the product using the coupon (via the redemption code). Once the retailer 30 receives the redemption request, it can take the code along with its retailer credentials to request IMMM data about the event as part of a sixth interaction (6). The returned data may contain rich information about the user 24 as well as the metadata around the content the user viewed when they selected the coupon offer. The MSO 28 who provides this information can be compensated via a transaction fee or some other licensing arrangement. A similar experience may arise as part of a seventh interaction (7) when a user 24 undertakes an in-store visit of a retailer's store 22. The user can present the coupon (e.g., QR code) to the Point Of Sale (POS) 22 where it is read into the retailer's system. An eighth interaction (8) can be performed in a manner similar to the sixth interaction (6) in order to be returned data about the user as well as metadata around the content the user viewed when they selected the coupon offer.

After the retailer receives the IMMM data, e.g., as part of one or both of the sixth and eighth interactions, it can then upload it to their systems for analysis as part of a ninth interaction (9). As described with respect to the IMMM 10, the CCSA may be used to provide a common fabric for both endpoint services and devices containing applications that want to synchronize content to an event model in a consistent way. Optionally, the CCSA may be agnostic to the underlying technology providing this capability and is a framework to provide input to IMMM 10. The IMMM 10 may then be used to merge identity with content into a single model based upon an event. The example described in the IMMM 10 is not limited to just an advertising model but could be used for other event contexts such as polls, games, ratings, social networking messages. The CCSA and IMMM together help leverage the MSO's strength in insofar as knowing what content the user is watching as well as deep user profile data. Combining these capabilities together has the potential to not only enhance the user experience, but also to provide cable and other industries with new opportunities to create new services.

Figure 2:
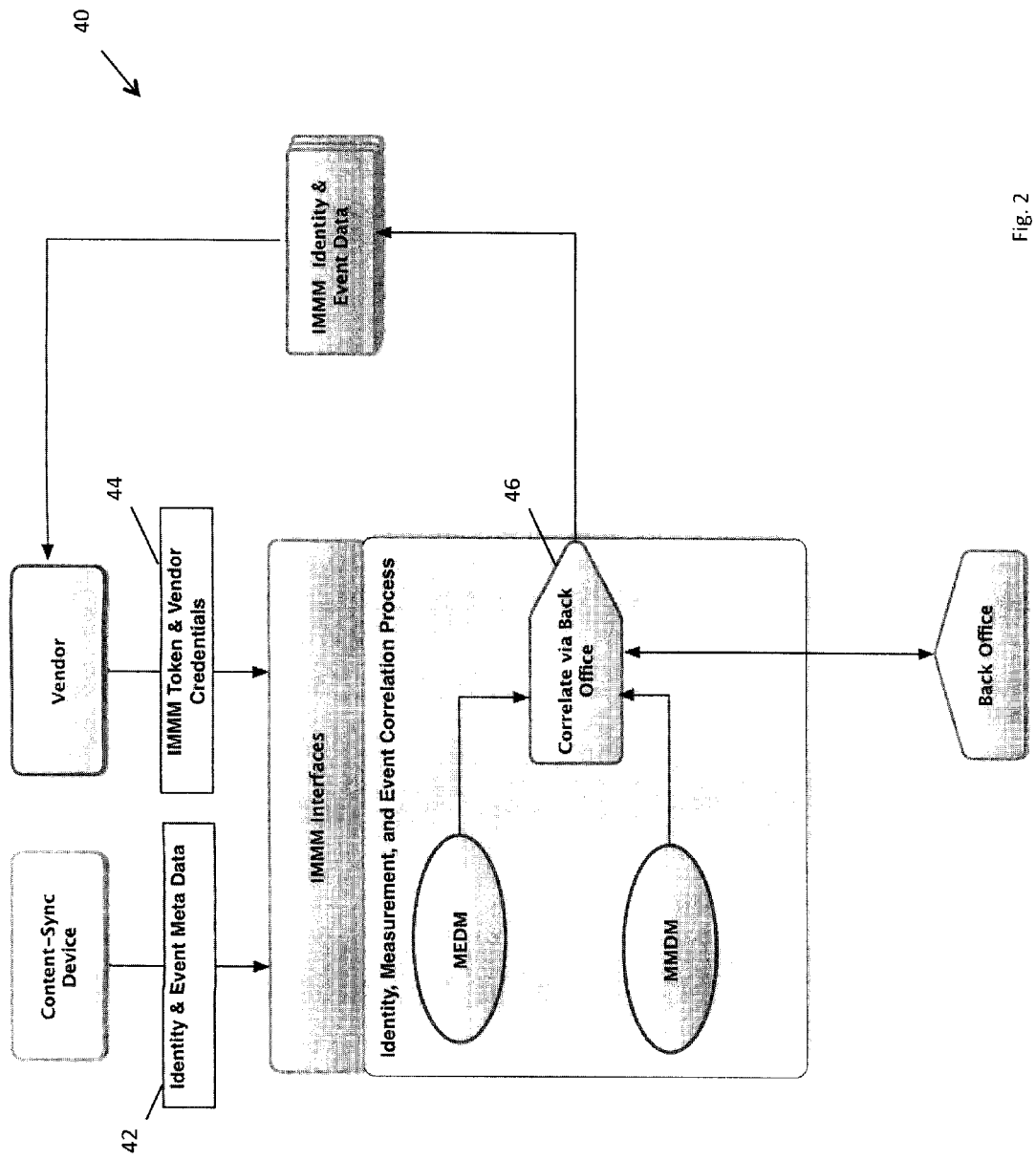
FIG. 2 illustrates of a flowchart for performing identity-media measurement in accordance with one non-limiting aspect of the present invention.

FIG. 2 illustrates of a flowchart 40 for performing identity-media measurement in accordance with one non-limiting aspect of the present invention. The method may be embodied in a computer-readable medium, computer program product or other suitable construct having non-transitory instructions, operable with a processor or logically executing concept, to facilitate one or more of the contemplated operations, steps, activities, manipulations, etc. The CCSA and/or the identity-media measurement APIs may be, or may be part of, such a computer-readable medium, optionally including other properties and/or capabilities in addition to those described with respect to FIG. 2. One or more of the devices and entities described in FIG. 1 or elsewhere herein may include such a computer-readable medium and/or non-transitory instructions sufficient to perform some or all of the process contemplated to facilitate the identity-media measurement. The flowchart 40 is predominately described with respect to performing identity-media measurement when content is sourced from a headend or other source of a cable television service provider for exemplary non-limiting purpose as the present invention fully contemplates its use and application in facilitating identity-media measurement for any type of electronically transmissible content.

After the subscriber responds to an event, such as by redeeming a coupon offer using a content-sync device, user identity and event metadata may be posted through IMMM interfaces to the IMMM Web service or other feature within the MSO domain as shown in Block 42. The IMMM Web service may then keep a record of the upload transaction and generate an IMMM ID (or token to be used later by a vendor for redemption) for the transaction. To facilitate recording the upload transaction, the content-sync device may configured to upload metadata sufficient to characterize the corresponding event, such as but not necessarily limited to the metadata having the attributes shown in the table below.

| Attribute | Description |
| --- | --- |
| userid | An opaque id that is derived when the subscriber is authenticated from an app on a device doing the content sync |
| deviceId | Device Id of the device you are interacting with. This could be a mac address, guide, etc. |
| contentId | Unique identifier of the content (e.g., Entertainment Identifier Registry—EIDR) |
| contentContext | Content context such as Live, VOD, DVR, Time Shifted, Start Over |
| mediaTime | Position in the asset currently being viewed. Adjusted to reflect the true position in the asset based upon the content context |
| channel | If linear content, the channel currently tuned |
| eventType | A constant that describes the type of the event being registered for notification. For example, a CHANNEL_CHANGED which returns the channel currently being watched |
| eventId | If you had an ad promotion it would be a unique identifier (used with eventType) to correlate the event with the "promoter" of the event. |

Once the subscriber redeems their coupon, the vendor may submit the corresponding credentials and the IMMM token (same as IMMM ID mentioned in step #1) via the IMMM interfaces as shown in Block 44. The credentials and token may be subsequently validated and the token may be used as a key to start an Identity, Measurement, and Event Correlation process shown in Block 46. The correlation process may correspond with correlating subscriber interactions (e.g. Media Event Data Model (MEDM) session start and session events) into measures (e.g. Media Measurement Data Model (MMDM)) as channel viewing sessions, whereby the channel viewing session may then be enriched and de-composited into program viewing sessions. Additionally, the MMDM program session data can then be enriched with subscriber identity and device identifiers to create data records usable by downstream redemption processes.

The MEDM may be related to low-level events generated with the media delivery platforms (e.g., headend, content-sync device, etc.). The media delivery platforms may evolve to support the MEDM directly, and/or adapters may transform existing proprietary formats into these well-known models. MEDMs may be developed for linear, non-linear, and interactive service delivery models or other forms of content streaming and communications. The MMDM may relate to media events being collected, filtered, enriched, transformed, and correlated, resulting in data ready for making measurement calculations. This processing may be unique to each service provider, and the details relating to the internal collection and processing of the media events into measurement data may be perform in a manner consistent with the operation contemplated herein. However, consistent definitions of measurements may be utilized, as described herein, to provide data that may be foundational to deriving data products, including metrics.

Figure 3:
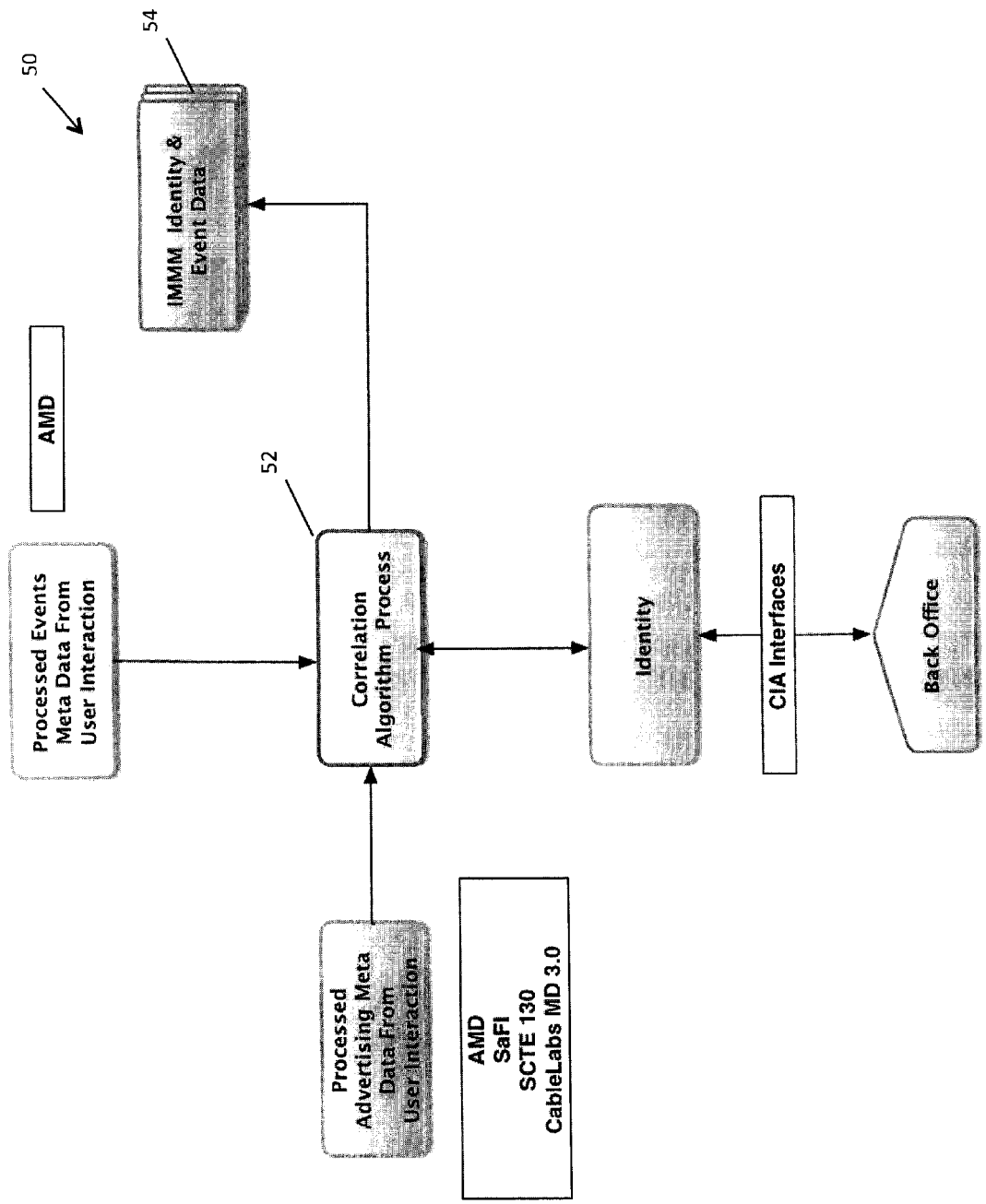
FIG. 3 illustrates a flowchart for a correlation process in accordance with one non-limiting aspect of the present invention.

FIG. 3 illustrates a flowchart 50 for a correlation process in accordance with one non-limiting aspect of the present invention. During the correlation process, input may come from the client (subscriber) which conforms to the Audience Measurement Data (AMD) Specification (OC-SP-AMD-D02-130301, the disclosure of which is hereby incorporated by reference in its entirety). That data may then be processed based upon the events (AMD & MEDM), the identity of the user via back office Cable Information Architecture (CIA) interfaces and which Campaign (e.g., advertising) the event is associated with. The Campaign portion may be based upon AMD, Subscription and Fulfillment (SaFi) Interfaces Specifications, SCTE 130 (Digital Program Insertion—Advertising Systems Interfaces) and CableLabs Content 3.0 Specification, the disclosures of which are hereby incorporated by reference in their entirety.

The type of events and measurement activity performed in the correlation process may include generating AMD MEDM events and AMD MMDM measures. The AMD MEDM events may include: Session Start Event; Session End Event; Play Control Event; and/or Application State Event. The AMD MMDM measures may include: Linear Tuning Activity (and control and state); Linear Viewing Session (and control and state); DVR Playback Session (and control and state); VOD Playback Session (and control and state); and/or Application Session (and control and state). After the correlation process associated with 52 has completed, a schema (with data) or other database construct sufficient to represent the IMMM, i.e., identity and event metadata, may be generated in Block 54. The metadata include with such an IMMM schema can be ingested by the vendor's BI (Business Intelligence) software to perform analysis, and optionally may include the metadata having one or more of the attributes shown in the table below (entity response for a particular attribute is shown before the hyphen).

| Data Source - Attribute | Description |
|---|---|
| BackOffice - Customer.customerId | An opaque id that is derived when the subscriber is authenticated from an app on a device doing the content sync |
| MEDM - Resource.PhysicalDevice | Device Id of the device you are interacting with. This could be a mac address, guide, etc. |
| MMDM - Aired_Program.EIDR_Content_Id | Unique identifier of the content (e.g., Entertainment Identifier Registry—EIDR) |
| MMDM - Linear_Tuning_Activity.Tuning_Activity_Type_Code | Content context such as Live, VOD, DVR, Time Shifted, Start Over |
| MMDM - Linear_Viewing_Session.Beg_Offset_Sec_From_True_Beg | Position in the asset currently being viewed. Adjusted to reflect the true position in the asset based upon the content context |
| MMDM - channel Linear_Viewing_Session.Station_Id or Linear_Tuning_Activity.Station_Id | If linear content, the channel currently tuned |
| MEDM - Linear_Tuning_Activity.Initiation_Code | A constant that describes the type of the event being registered for notification. For example, a CHANNEL_CHANGED which returns the channel currently being watched |
| MEDM - SegmentEvent.ContentID | If you had an ad promotion it would be a unique identifier (used with eventType) to correlate the event with the "promoter" of the event. |

Figure 4:
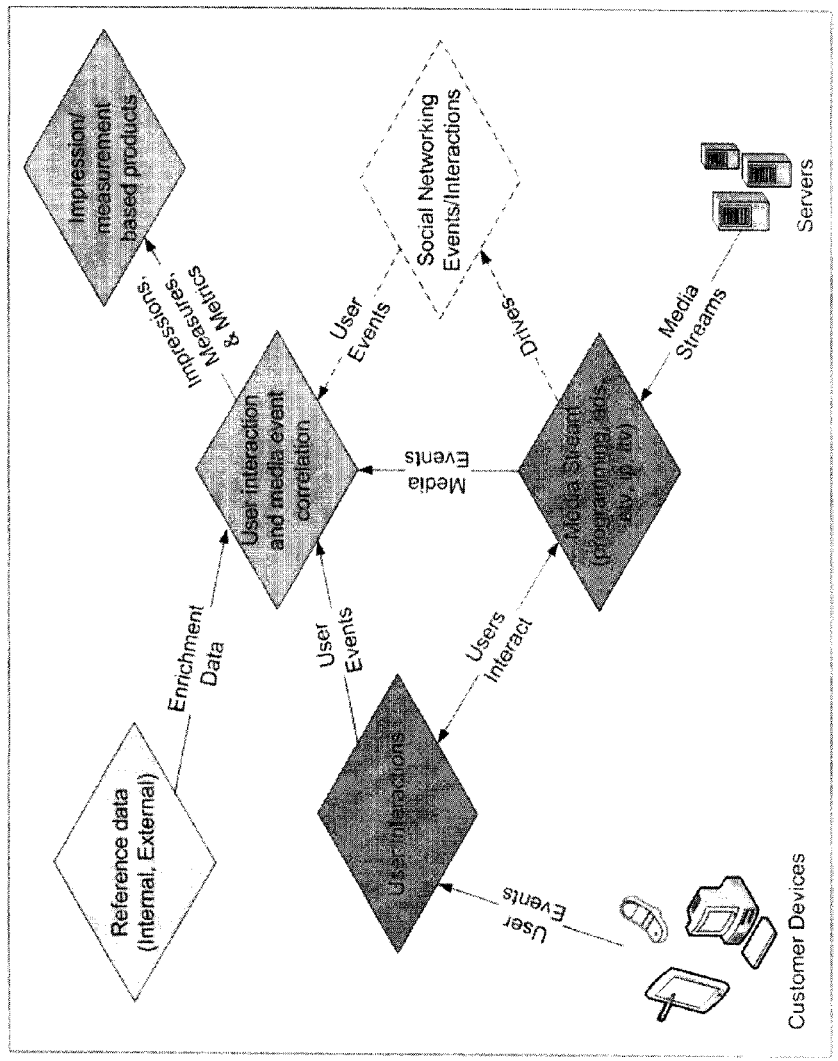
FIG. 4 illustrates a diagram of functional building blocks contemplated for defining interoperability elements for measuring audience interactions and the effectiveness of programming and advertising in accordance with one non-limiting aspect of the present invention.

FIG. 4 illustrates a diagram 60 of functional building blocks contemplated for defining interoperability elements for measuring audience interactions and the effectiveness of programming and advertising in accordance with one non-limiting aspect of the present invention. Comparability of data across media delivery platforms and across service providers may be imperative for service providers to deliver the most value to subscribers in terms of effective programming and relevant advertising. In addition, it may be desirable to accomplish this while ensuring privacy protection for the subscribers. The functional building blocks include models covering media events (think of these as viewer interactions) and measurements (think of these as enriched and correlated viewer interactions). The lifecycle of user interactions and media stream definitions are shown as being generalized in the diagram. As users interact with video viewing devices, events may be generated. These events may include tuning, selecting options, and interacting with programming guides and applications. Metadata definitions and events associated with the media streams can then be correlated with the user interactions, resulting in measurement data that can then be summarized into impression metrics. These metrics can then be combined across service providers resulting in industry-wide analyses of audience uptake. Additional future opportunities may arise when service provider audience measurement and social networking measurement data are correlated, providing guidance for profile-based advertising and programming in near real-time.

Figure 5:
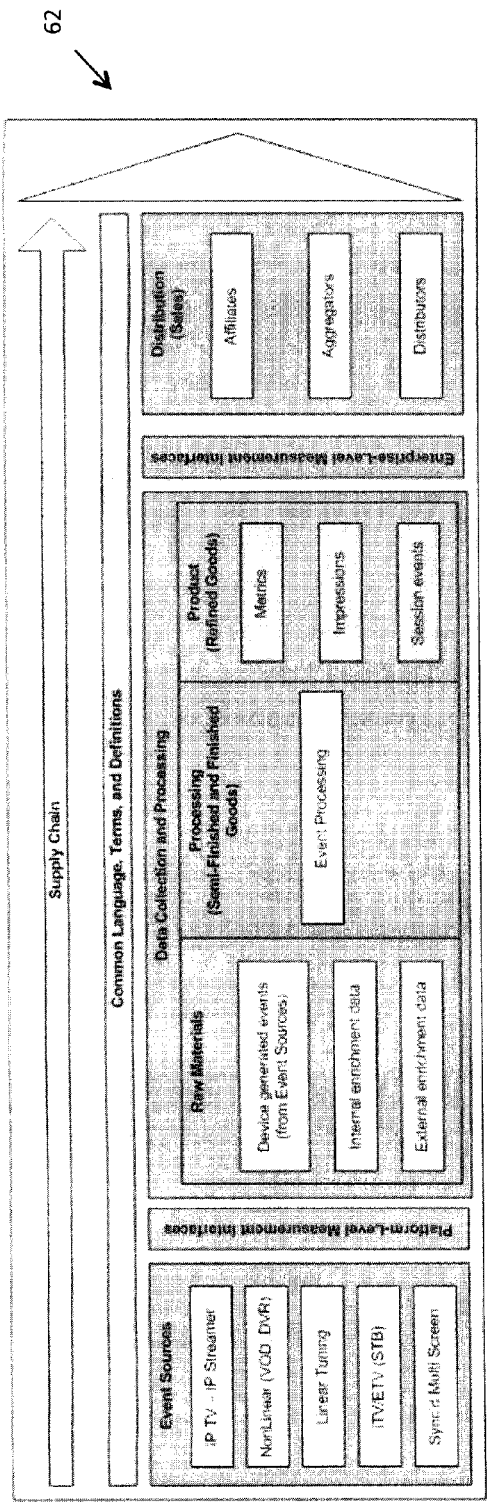
FIG. 5 illustrates a diagram for describing the IMMM from a supply chain perspective in accordance with one non-limiting aspect of the present invention.

FIG. 5 illustrates a diagram 62 for describing the IMMM from a supply chain perspective in accordance with one non-limiting aspect of the present invention. The diagram provides a more detailed view of the flow of interaction events from event sources as raw materials to delivery of measurement products as refined goods. As shown, for example, devices such as set-top boxes and smart tablets may be configured to operate in accordance with the present invention to facilitate generating interaction events that flow into event collection systems. These events may be filtered, enriched, transformed, and correlated into session measurement data whereupon further aggregation and slicing of the data may be used to produce the contemplated metrics.

Figure 6:
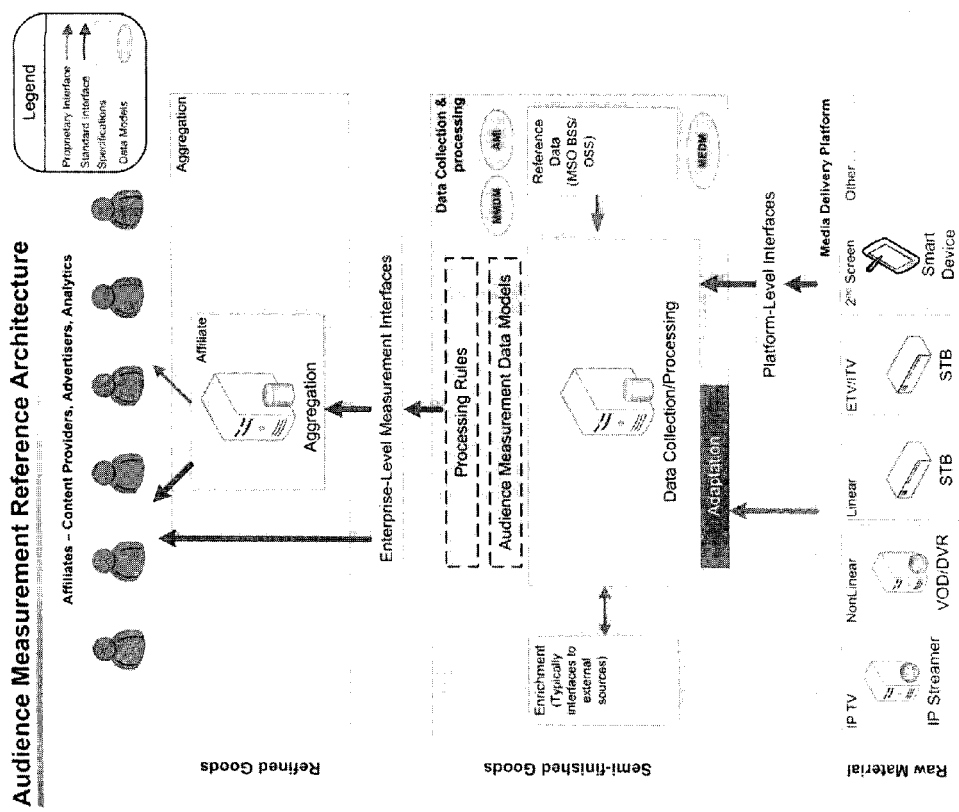
FIG. 6 illustrates a diagram of a contextual construct of the IMMM in accordance with one non-limiting aspect of the present invention.

FIG. 6 illustrates a diagram 64 of a contextual construct of the IMMM in accordance with one non-limiting aspect of the present invention. The diagram illustrates a plurality of affiliates. Service providers may send a variety of data products to any number of affiliates, including content owners, audience measurement firms, research firms, agencies/advertisers, and programmers. Optionally, the affiliates may consume data in Audience Measurement Interface (AMI) format, accessing it through the enterprise-level interfaces. A data collection and processing platform may be operable to store, aggregate, and process low-level event streams from media delivery platforms. This role may be the responsibility of a service provider, although agents of a service provider may implement some of these logical functions. Optionally, these platforms may collect MEDM data elements, process it, and deliver Media Measurement Data Model MMDM data elements. A media delivery platform may be a device or system that supports navigation/discovery, processing, or presentation of media to viewers, including traditional STBs, DVRs, VOD servers, and emerging platforms such as IP streaming servers servicing video gateways, PCs, mobile, and tablet devices. Optionally, the media delivery platform may also include interactive environments, such as EBIF, tru2way, and other application platforms having capabilities sufficient to facilitate generating MEDM data elements.

An enterprise-level measurement interface may provide formats and interfaces that serve to provide access to data at the enterprise level, e.g., between service providers and the affiliates of their choosing. Data access may be via a data representation, encoded format, or other means. Processing rules may be used to govern how media event data is processed to support enterprise-level interfaces and data products. Requirements on data collection and processing platforms in support of these rules, such as data retention, auditing, security, and privacy, may be included here. A platform interface, including transport protocol and data format definitions, may be included for the media delivery platform. This interface can ensure data quality and comparability, and all implementations should conform to the MEDM. Conformance can lead to cost-effective product implementations and integrations. For media delivery platforms that do not implement a well-defined interface, a proprietary adapter may be used to define conformance with the MEDM, e.g., how a data format maps to the MEDM. The data collection and processing platform May physically store data in an implementation-specific way that allows it to conform to the MEDM so processing rules can result in deterministic results independent of the source or format of the data collected via the platform interface.

Figure 7:
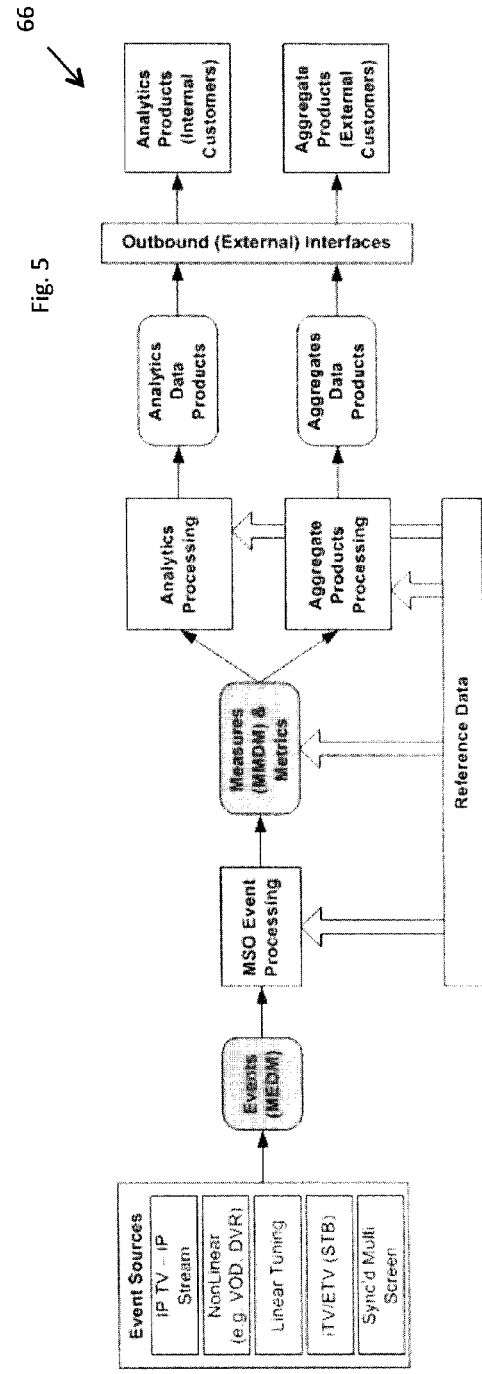
FIG. 7 illustrates a diagram showing another perspective on the data models in accordance with one non-limiting aspect of the present invention.

FIG. 7 illustrates a diagram 66 showing another perspective on the data models in accordance with one non-limiting aspect of the present invention. To summarize, traversing the diagram left to right, devices generate media events (MEDM). These events may be processed by the service provider systems (MSO Event Processing) resulting in measurement data (MMDM). Further processing of the measurement data may result in metrics data (AMI) that can be made available via the enterprise-level interfaces, to affiliates and other users in business decision making (consumers of AM Products).

Figure 8:
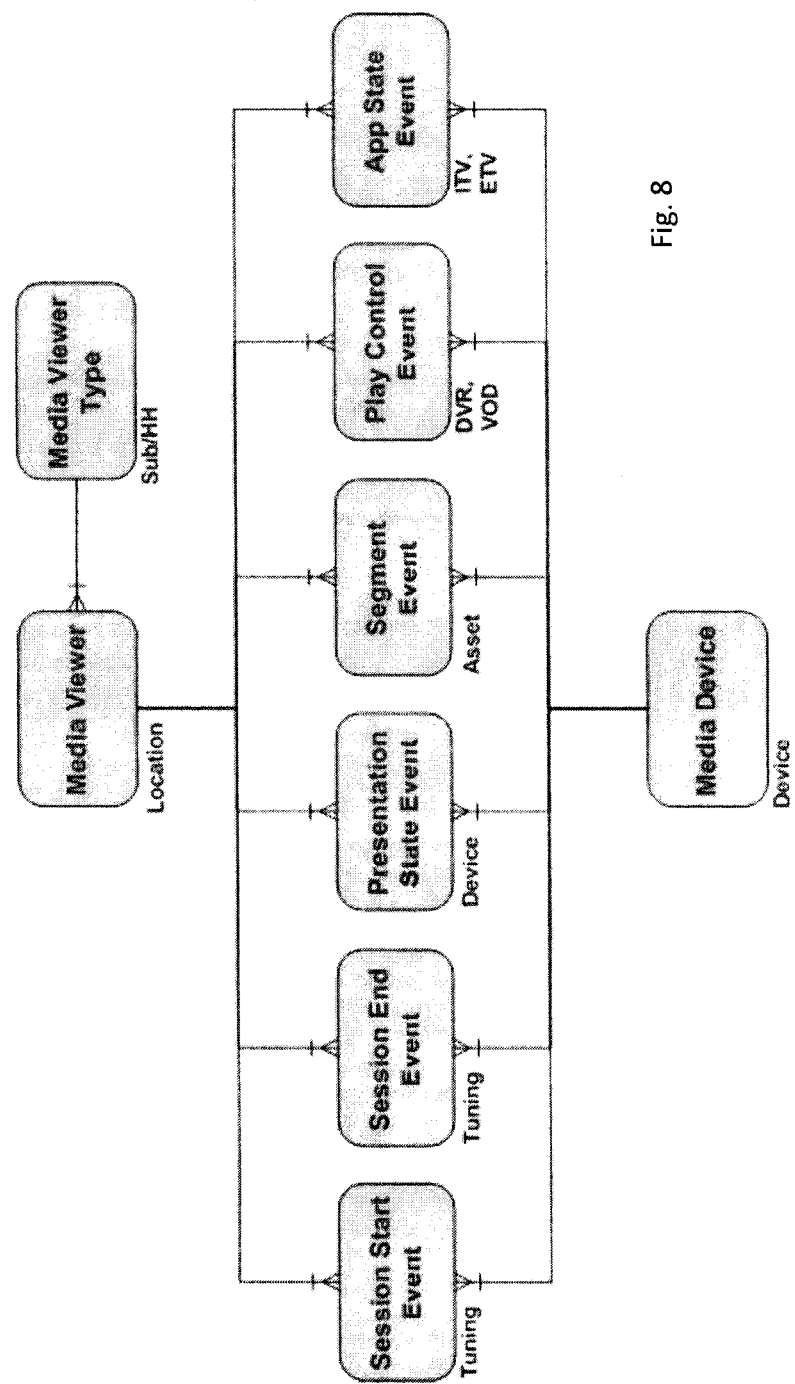
FIG. 8 illustrates a diagram of the MEDM from a conceptual level entity-relationship diagram in accordance with one non-limiting aspect of the present invention.

FIG. 8 illustrates a diagram 68 of the MEDM from a conceptual level entity-relationship diagram in accordance with one non-limiting aspect of the present invention. The diagram may be used to conceptually define a model for events related to the delivery, processing, or presentation of media to viewers, such as tuning to a broadcast channel, selecting and controlling an on-demand asset, or recording to a DVR. The diagram is shown as being generalized to express any linear and non-linear service, including but not limited to DVR and home networking, mobile, and online content delivery. The MEDM may be defined, for example, by contextual, conceptual, and logical models describing increasing levels of detail of the model. Many encoding formats and transport protocols may be defined that conform to the model. Differing circumstances may dictate optimal interfaces for gathering or sharing measurement data. For instance, an enterprise-level interface that exports huge volumes of data from a service provider to an affiliate can look very different from a mechanism used to log and transmit events from an embedded device on a constrained legacy cable network.

The diagram 68 is shown without attributes for exemplary purposes in order to simplify the description to entities only. The base entity may be the MediaEvent. The various event entities all may extend the base MediaEvent entity. For clarity, MediaEvent is not shown in the diagram. In practice, a stream of MediaEvents may be generated by a device that delivers processes or presents media. MediaEvents may then be collected by a service provider or designated agent. Data coming off a specific device, such as a set-top box or VOD server, may not fully populate the data model, and some attributes may be sourced from service-provider reference or enrichment data. For instance, a set-top box interface may not include any information about a viewer. The association of data from a set-top box and the viewer information may be made by the service provider after the data is collected from the set-top box or when exposing data via the MEDM. MEDM entity descriptions and relationships may be correspond with those described in the table below.

| MEDM Entity | Entity Description | Entity Relationships |
|---|---|---|
| Media Viewer | The MediaViewer entity represents a viewer of media content. Media viewers may be known to the service provider, in which case an associated Media Viewer Type is referenced. | A MediaViewer belongs to a single household. The MediaViewer has many media events associated with it. |
| Media Viewer Type | The MediaViewerType entity provides descriptive information about known Media Viewers. | The MediaViewerType may represent either an entire household or a specific viewer in a household and has MediaViewers assigned to it. |

-continued

| MEDM Entity | Entity Description | Entity Relationships |
|---|---|---|
| Session Start Event | The SessionStartEvent is a specialization of MediaEvent and inherits all of its attributes. Session is a general term indicating a linear TV channel or a non-linear video segment.<br>Session start is a generalized representation of the initiation of media processing, which may indicate selection of a linear broadcast channel, or the start of a non-linear session. Non-linear sessions may be supported by many environments, such as traditional cable VOD, Digital Video Recorder (DVR), Web-based video playout, home networked streaming, or any other non-broadcast media processing environment. Every SessionStartEvent SHALL be paired with a SessionEndEvent, grouping all intermediate events into a logical session sequence. | An instance of a SessionStartEvent is associated with a MediaViewer whose actions generated the event. It is also associated with the single MediaDevice that actually generated the event. |
| Session End Event | SessionEndEvent is a specialization of MediaEvent that represents the termination of media processing. Session termination may represent tuning away from a linear channel, the end of a DVR recording, or the termination of a non-linear session. | An instance of a SessionEndEvent is associated with a MediaViewer whose actions generated the event. And it is also associated with the single MediaDevice that actually generated the event. |
| Presentation State Event | PresentationStateEvent is a specialization of MediaEvent that represents a change in the presentation attributes of a media presentation. Examples include a switch from the main display to picture-in-picture (PiP) on a TV, scaling the video window on a TV, muting audio, bringing an active DVR recording to the foreground, or another such change. PresentationStateEvents SHALL be generated with every SessionStartEvent. | An instance of a PresentationStateEvent is associated with a MediaViewer whose actions generated the event. And it is also associated with the single MediaDevice that actually generated the event. |
| Segment Event | SegmentEvent is a specialization of MediaEvent that represents the processing of a logical segment of content. For example, as the boundaries between entertainment and advertising segments are crossed, SegmentEvents MAY be generated to indicate these boundary crossings. The MediaOffset attribute found in all MediaEvents between SegmentEvents are offsets within the ContentID identified by the SegmentEvent. Boundaries may be identified by in-band signals, such as SCTE 35 markers, or by schedule metadata. | An instance of a SegmentEvent is associated with a MediaViewer whose actions generated the event. And it is also associated with the single MediaDevice that actually generated the event. |
| Play Control Event | PlayControlEvent is a specialization of MediaEvent that represents a trick mode event during presentation of non-linear content. A transition from presenting linear content live to presenting from a time-shift buffer is considered a transition to non-linear content. Trick modes include pause and skip. Skip can be used to model forward and backward play at any speed. | An instance of a PlayControlEvent is associated with a MediaViewer whose actions generated the event. And it is also associated with the single MediaDevice that actually generated the event. |
| App State Event | AppStateEvent is a specialization of MediaEvent that represents the loading, launching, suspension, or termination of an interactive application. Examples of interactive applications are ETV or OCAP applications. Not addressed here is application instrumentation, which is the collection of application level clickstream events used to interpret viewer behavior within the context of an application (for example, companion applications). | An instance of an AppStateEvent is associated with a MediaViewer whose actions generated the event. And it is also associated with the single MediaDevice that actually generated the event. |
| Media Device | The MediaDevice entity represents a media delivery, processing, or presentation platform. Examples include cable set-top boxes, televisions, tablets, PCs, mobile devices, and any other devices that present media to a viewer. | The MediaDevice is associated with one or more MediaEvents. In practice, this means that each MediaEvent must be associated with a device. |

The following tables provide details on each of the MEDM entities
MediaViewerType Entity

| Name | Data Type | Nullable | Documentation |
|---|---|---|---|
| MediaViewerTypeID | int(10) | No | Unique identifier for the record. This is the primary key. |
| AnonHHID | int(10) | No | The AnonHHID value SHALL be a GUID Error! Reference source not found. that |

-continued

| Name | Data Type | Nullable | Documentation |
|---|---|---|---|
| AnonViewerID | int(10) | No | indicates a unique viewing household. All events associated with a specific household will be associated with a MediaViewer entity with the same AnonHHID. This value does not represent, nor can it be externally associated with, a specific household or viewer.<br>The AnonViewerID value SHALL be a GUID Error! Reference source not found. that indicates a unique viewer. All events associated with a specific viewer will be associated with a MediaViewer entity with the same AnonHHID. This value does not represent, nor can it be externally associated with, a specific household or viewer. In some environments, this value may not be able to be determined. |
| MediaViewerType Desc | Varchar (255) | No | The MediaViewerTypeDesc value SHALL be an unbounded String indicating the media viewer type. |

MediaViewer Entity

| Name | Data Type | Nullable | Documentation |
|---|---|---|---|
| MediaViewerID | int(10) | No | Unique identifier for the media viewer. This is the primary key. |
| GeoCode | int(10) | No | The Geocode value SHALL indicate the physical location associated with this subscriber household. Additional external definitions are required to determine allowable values within a defined implementation context, i.e., zipcode. |
| MediaViewer TypeID | int(10) | No | Link to the Media Viewer Type table. |

SessionStartEvent Entity

| Name | Data Type | Nullable | Documentation |
|---|---|---|---|
| IDValue | int(10) | No | Unique identifier for the record. This is the primary key. |
| DeviceID | int(10) | No | The unique anonymized (de-identified) identifier for the viewing device. |
| MediaViewerID | int(10) | No | The unique anonymized (de-identified) identifier for the viewer (user). |
| SessionID | varchar (128) | No | The Session ID value SHALL be a UUID Error! Reference source not found. representing a logical grouping of media events. For instance, the start, end, and intermediate events related to a VOD program viewing can be grouped together using SessionID. |
| SessionGroupID | varchar (128) | No | The SessionGroupID value SHALL be a UUID Error! Reference source not found. identifying a group of sessions. For instance, a multi-room DVR scenario may support multiple sessions, e.g., viewing a portion of a program in one room and finishing in another. Multiple sessions can be associated using this value. |
| Timestamp | time stamp | No | The Timestamp value SHALL represent the exact time at which an event is generated, expressed as a UTC value Error! Reference source not found.. |
| MediaOffset | int(10) | No | The MediaOffset value SHALL represent the offset, to millisecond accuracy, from the beginning of associated entertainment or ad content (see ContentID in SegmentEvent) at which an event occurs. For instance, an AppStateEvent may occur some seconds after the beginning of an ad.<br>The MediaOffset value is deterministic for a given piece of content such that a sequence of MediaEvents associated with a piece of content will display the following characteristics for MediaOffset:<br>Will increase when processing in the forward |

-continued

| Name | Data Type | Nullable | Documentation |
|---|---|---|---|
| | | | direction<br>Will decrease when processing in the reverse direction<br>Will increase/decrease faster than real time when processing at rates faster than 1X<br>May have gaps. For example, if replacing or skipping a 30-second advertisement that is part of the original content file, the MediaOffset may have a gap of 30 seconds. |
| ServiceContext | varchar (255) | No | The ServiceContext value SHALL be a URI Error! Reference source not found. that indicates the linear or non-linear context of a service selection. For broadcast services, this value MAY be the EIDR Error! Reference source not found. value of the programming feed. For non-linear services, this MAY be the Provider/Asset ID (PAID) Error! Reference source not found. of the asset, or an EIDR. |
| NavigationContextID | varchar (128) | No | The NavigationContextID value SHALL be a UUID Error! Reference source not found. identifying a navigation session that was the source of navigation. For example, this value MAY be used to associate this event with an instance of an application, thereby allowing an application level event model to be correlated with this event. The NavigationContextID may be associated with an application that can be a feature-rich EPG, application, or STB firmware that receives and interprets remote control key codes. |
| NavigationContext Code | tinyint | No | The NavigationContextCode value SHALL provide the context from which the session was started. Allowable values are constrained to the following enumeration:<br>0 = Navigator. Session was started via service provider navigator. The service provider navigator may be the primary Electronic Program Guide, a so-called 'mini-guide', VOD library navigator, or any other primary navigation tool.<br>1 = Application. Session was started via any application other than the service provider navigator. Examples include STB resident, bound or unbound, or external device (PC, tablet, phone, etc.) based applications that request a service selection in response to viewer input.<br>2 = Numeric input. Session was started in response to a viewer pressing number keys on a remote. This function is typically performed by the navigator, but is identified as a separate code.<br>3 = Channel up/down. Session was started in response to a viewer pressing the channel up/down keys on a remote. This function is typically performed by the navigator, but is identified as a separate code.<br>4 = Start-up. Service selection occurred on device start up. |

SessionEndEvent Entity

| Name | Data Type | Nullable | Documentation |
|---|---|---|---|
| IDValue | int(10) | No | Unique identifier for the record. This is the primary key. |
| DeviceID | int(10) | No | The unique anonymized (de-identified) identifier for the viewing device. |
| MediaViewerID | int(10) | No | The unique anonymized (de-identified) identifier for the viewer (user). |
| SessionID | varchar (128) | No | The Session ID value SHALL be a GUID Error! Reference source not found. representing a logical grouping of media events. For instance, the start, end, and intermediate events related to a VOD program viewing can be grouped together using SessionID. |

-continued

| Name | Data Type | Nullable | Documentation |
|---|---|---|---|
| SessionGroupID | varchar (128) | No | The SessionGroupID value SHALL be a GUID Error! Reference source not found. identifying a group of sessions. For instance, a multi-room DVR scenario may support multiple sessions, e.g., viewing a portion of a program in one room and finishing in another. Multiple sessions can be associated using this value. |
| Timestamp | time stamp | No | The Timestamp value SHALL represent the exact time at which an event is generated, expressed as a UTC value Error! Reference source not found.. |
| MediaOffset | int(10) | No | The MediaOffset value SHALL represent the offset, to millisecond accuracy, from the beginning of associated entertainment or ad content (see ContentID in SegmentEvent) at which an event occurs. For instance, an AppStateEvent may occur some seconds after the beginning of an ad.<br>The MediaOffset value is deterministic for a given piece of content such that a sequence of MediaEvents associated with a piece of content will display the following characteristics for MediaOffset:<br>Will increase when processing in the forward direction<br>Will decrease when processing in the reverse direction<br>Will increase/decrease faster than real time when processing at rates faster than 1X<br>May have gaps. For example, if replacing or skipping a 30-second advertisement that is part of the original content file, the MediaOffset may have a gap of 30 seconds. |
| TerminationCode | tinyint | No | The TerminationCode value SHALL indicate the reason media processing has ended. Allowable values are constrained to the following enumeration:<br>0 = Tune-away. For linear services, processing ended when another service is selected.<br>1 = Play-to-end. For non-linear services, processing ends when the media reaches the end point.<br>2 = UserTerminated. For non-linear services, processing ends based on a user action.<br>3 = System. Processing ends when a system event causes termination, as in a transition to power stand-by mode. |
| Navigation ContextID | var char (128) | No | The NavigationContextID value SHALL be a GUID Error! Reference source not found. identifying an application that was the source of termination. See SessionStartEvent, NavigationContextID, for a complete description. |
| Navigation ContextCode | tinyint | No | The NavigationContextCode value SHALL indicate the context from which the service was terminated where the TerminationCode value is '0' or '2'. See Section 0, SessionStartEvent Entity, NavigationContextCode, for the definition of allowable values. |

PresentationStateEvent Entity

| Name | Data Type | Nullable | Documentation |
|---|---|---|---|
| IDValue | int(10) | No | Unique identifier for the record. This is the primary key. |
| DeviceID | int(10) | No | The unique anonymized (de-identified) identifier for the viewing device. |
| MediaViewerID | int(10) | No | The unique anonymized (de-identified) identifier for the viewer (user). |
| SessionID | var char (128) | No | The Session ID value SHALL be a GUID Error! Reference source not found. representing a logical grouping of media events. For instance, |

-continued

| Name | Data Type | Nullable | Documentation |
|---|---|---|---|
| | | | the start, end, and intermediate events related to a VOD program viewing can be grouped together using SessionID. |
| SessionGroupID | varchar (128) | No | The SessionGroupID value SHALL be a GUID Error! Reference source not found. identifying a group of sessions. For instance, a multi-room DVR scenario may support multiple sessions, e.g., viewing a portion of a program in one room and finishing in another. Multiple sessions can be associated using this value. |
| Timestamp | time stamp | No | The Timestamp value SHALL represent the exact time at which an event is generated, expressed as a UTC value Error! Reference source not found.. |
| MediaOffset | int(10) | No | The MediaOffset value SHALL represent the offset, to one second accuracy, from the beginning of associated entertainment or ad content (see ContentID in SegmentEvent) at which an event occurs. For instance, an AppStateEvent may occur some seconds after the beginning of an ad. The MediaOffset value is deterministic for a given piece of content such that a sequence of MediaEvents associated with a piece of content will display the following characteristics for MediaOffset:<br>Will increase when processing in the forward direction<br>Will decrease when processing in the reverse direction<br>Will increase/decrease faster than real time when processing at rates faster than 1X<br>May have gaps. For example, if replacing or skipping a 30-second advertisement that is part of the original content file, the MediaOffset may have a gap of 30 seconds. |
| Codec | tinyint | No | The Codec value SHALL indicate the video format used in presentation. Allowable values are constrained to the following enumeration:<br>0 = MPEG-2<br>1 = MPEG-4<br>2 = H.264 |
| Audio Status | tinyint | No | The AudioStatus value SHALL indicate the audio status. Allowable values are constrained to the following enumeration:<br>0 = Audio On<br>1 = Mute |
| DisplayMode | tinyint | No | The DisplayMode value SHALL indicate the display mode. Allowable values are constrained to the following enumeration:<br>0 = full screen<br>1 = scaled, i.e., Picture in Picture |
| PresentingFlag | tinyint | No | The PresentingFlag value SHALL indicate whether the associated service is being presented on a display, as opposed to being recorded, e.g., on a local DVR. A potential usage of this data model is to assign a SessionGroupID to a recording, and apply it to all subsequent views. Allowable values are constrained to the following enumeration:<br>0 = not presenting on screen<br>1 = presenting |
| PresentationRegion | varchar (16) | No | The PresentationRegion value SHALL contain numeric values indicating the origin of the presentation onscreen, e.g., 0,0 for full screen display. The upper left corner is 0,0. |
| OccludedRegions | varchar (32) | No | The OccludedRegions value SHALL contain a set of numeric values indicating the origin, width, and height of areas of the display that contain visual material not associated with the service context of the present session. For example, an application may paint over a full screen video presentation, and this information allows measurement of the fact that the video is not fully presented. |

-continued

| Name | Data Type | Nullable | Documentation |
|---|---|---|---|
| Resolution | var char (16) | No | The Resolution value SHALL contain numeric values indicating the pixel resolution of the presentation, e.g., 640×480 for Standard Definition TV. |
| AspectRatio | var char (16) | No | The AspectRatio value SHALL contain numeric values indicating the proportional relationship of the presentation width and height, e.g., 4:3, 16:9. |
| GMTCode | var char (16) | No | The GMTCode value SHALL indicate the GMT zone Error! Reference source not found. from which an event was generated. The GMTCode value may change during a session. For example, a mobile device. |
| GeoCode | var char (16) | No | The Geocode value SHALL indicate the physical location from which this event was generated. Additional external definitions are required to determine allowable values within a defined implementation context, i.e., zipcode. |
| BitRate | int(10) | No | The BitRate value SHALL indicate the data rate of media delivery in IP delivery platforms, in Kbps. In some environments, such as adaptive bit-rate delivery over the internet, video presentation quality may degrade for some period. |
| Format | var char (16) | No | The Format value SHALL contain a String indicating the video presentation format, e.g., "1080i", "1080p", "SD", "HD". |

SegmentEvent Entity

| Name | Data Type | Nullable | Documentation |
|---|---|---|---|
| IDValue | int(10) | No | Unique identifier for the record. This is the primary key. |
| DeviceID | int(10) | No | The unique anonymized (de-identified) identifier for the viewing device. |
| MediaViewerID | int(10) | No | The unique anonymized (de-identified) identifier for the viewer (user). |
| SessionID | var char (128) | No | The Session ID value SHALL be a GUID Error! Reference source not found. representing a logical grouping of media events. For instance, the start, end, and intermediate events related to a VOD program viewing can be grouped together using SessionID. |
| SessionGroupID | var char (128) | No | The SessionGroupID value SHALL be a GUID Error! Reference source not found. identifying a group of sessions. For instance, a multi-room DVR scenario may support multiple sessions, e.g., viewing a portion of a program in one room and finishing in another. Multiple sessions can be associated using this value. |
| Timestamp | time stamp | No | The Timestamp value SHALL represent the exact time at which an event is generated, expressed as a UTC value Error! Reference source not found.. |
| MediaOffset | int(10) | No | The MediaOffset value SHALL represent the offset, to one second accuracy, from the beginning of associated entertainment or ad content (see ContentID in SegmentEvent) at which an event occurs. For instance, an AppStateEvent may occur some seconds after the beginning of an ad.<br>The MediaOffset value is deterministic for a given piece of content such that a sequence of MediaEvents associated with a piece of content will display the following characteristics for MediaOffset:<br>Will increase when processing in the forward direction<br>Will decrease when processing in the reverse direction<br>Will increase/decrease faster than real time when processing at rates faster than 1X |

-continued

| Name | Data Type | Nullable | Documentation |
|---|---|---|---|
| | | | May have gaps. For example, if replacing or skipping a 30-second advertisement that is part of the original content file, the MediaOffset may have a gap of 30 seconds. |
| ContentID | var char (255) | No | The ContentID value SHALL be a URI Error! Reference source not found. indicating a content identifier. A number of identifier formats may be used in practice, including EIDR Error! Reference source not found., PAID Error! Reference source not found., or other. |
| EntryCode | tinyint | No | The EntryCode value SHALL indicate the context in which a segment was entered. All segment events must be bounded by segment events with EntryFlag values indicating the entrance and exit into and from a logical content asset. Allowable values are constrained to the following enumeration:<br>0 = Start. Indicates a leading segment boundary is crossed while presenting media in a forward play mode.<br>1 = End. Indicates a segment boundary is crossed while presenting media in a reverse play mode.<br>2 = Internal. Indicates a segment is entered between the start and end boundaries. This may be the case when a linear channel is selected during the middle of a program. |
| Duration | int(10) | No | The Duration value SHALL be a numeric value indicating the duration in seconds of the current segment. A value of '0' SHALL indicate that the segment duration is not known, for instance, in the case of a live sporting event. |

PlayControlEvent Entity

| Name | Data Type | Nullable | Documentation |
|---|---|---|---|
| IDValue | int(10) | No | Unique identifier for the record. This is the primary key. |
| DeviceID | int(10) | No | The unique anonymized (de-identified) identifier for the viewing device. |
| MediaViewerID | int(10) | No | The unique anonymized (de-identified) identifier for the viewer (user). |
| SessionID | var char (128) | No | The Session ID value SHALL be a GUID Error! Reference source not found. representing a logical grouping of media events. For instance, the start, end, and intermediate events related to a VOD program viewing can be grouped together using SessionID. |
| SessionGroupID | var char (128) | No | The SessionGroupID value SHALL be a GUID Error! Reference source not found. identifying a group of sessions. For instance, a multi-room DVR scenario may support multiple sessions, e.g., viewing a portion of a program in one room and finishing in another. Multiple sessions can be associated using this value. |
| Timestamp | time stamp | No | The Timestamp value SHALL represent the exact time at which an event is generated, expressed as a UTC value Error! Reference source not found.. |
| MediaOffset | int(10) | No | The MediaOffset value SHALL represent the offset, to one second accuracy, from the beginning of associated entertainment or ad content (see ContentID in SegmentEvent) at which an event occurs. For instance, an AppStateEvent may occur some seconds after the beginning of an ad. The MediaOffset value is deterministic for a given piece of content such that a sequence of MediaEvents associated with a piece of content will display the following characteristics for MediaOffset:<br>Will increase when processing in the forward direction |

-continued

| Name | Data Type | Nullable | Documentation |
|---|---|---|---|
| | | | Will decrease when processing in the reverse direction
Will increase/decrease faster than real time when processing at rates faster than 1X
May have gaps. For example, if replacing or skipping a 30-second advertisement that is part of the original content file, the MediaOffset may have a gap of 30 seconds. |
| TrickModeCode | tinyint | No | The TrickModeCode value SHALL indicate the playback mode, or 'trick play' mode. Allowable values are constrained to the following enumeration:
0 = Play
1 = Skip |
| Velocity | tinyint | No | The Velocity value SHALL indicate the playback speed and direction when TrickModeCode is '0', or play. For instance, if TrickModeCode = 0 (Play), a Velocity value of +2 indicates fast-forward at 2X speed, and a velocity value of −2 indicates reverse at 2X speed. A value of '0' indicates paused. |

AppStateEvent Entity

| Name | Data Type | Nullable | Documentation |
|---|---|---|---|
| IDValue | int(10) | No | Unique identifier for the record. This is the primary key. |
| DeviceID | int(10) | No | The unique anonymized (de-identified) identifier for the viewing device. |
| MediaViewerID | int(10) | No | The unique anonymized (de-identified) identifier for the viewer (user). |
| SessionID | var char (128) | No | The Session ID value SHALL be a GUID Error! Reference source not found. representing a logical grouping of media events. For instance, the start, end, and intermediate events related to a VOD program viewing can be grouped together using SessionID. |
| SessionGroupID | var char (128) | No | The SessionGroupID value SHALL be a GUID Error! Reference source not found. identifying a group of sessions. For instance, a multi-room DVR scenario may support multiple sessions, e.g., viewing a portion of a program in one room and finishing in another. Multiple sessions can be associated using this value. |
| Timestamp | time stamp | No | The Timestamp value SHALL represent the exact time at which an event is generated, expressed as a UTC value Error! Reference source not found.. |
| MediaOffset | int(10) | No | The MediaOffset value SHALL represent the offset, to one second accuracy, from the beginning of associated entertainment or ad content (see ContentID in SegmentEvent) at which an event occurs. For instance, an AppStateEvent may occur some seconds after the beginning of an ad. The MediaOffset value is deterministic for a given piece of content such that a sequence of MediaEvents associated with a piece of content will display the following characteristics for MediaOffset:
Will increase when processing in the forward direction
Will decrease when processing in the reverse direction
Will increase/decrease faster than real time when processing at rates faster than 1X
May have gaps. For example, if replacing or skipping a 30-second advertisement that is part of the original content file, the MediaOffset may have a gap of 30 seconds. |

-continued

| Name | Data Type | Nullable | Documentation |
|---|---|---|---|
| AppState | tinyint | No | The AppState value SHALL indicate application lifecycle state. Allowable values are constrained to the following enumeration:<br>0 = Loaded<br>1 = Launched<br>2 = Paused<br>3 = Suspended<br>4 = Terminated |
| ReasonCode | var char (32) | No | The ReasonCode value SHALL indicate the reason for an application lifecycle transition; for example, why an application was terminated. Additional external definitions are required to determine allowable values within a defined implementation context. |
| AppID | var char (16) | No | The AppID value SHALL indicate the associated application identifier, as defined by the format definition of the application. For example, Error! Reference source not found. and Error! Reference source not found. define formats for AppID. |
| InstanceID | var char (16) | No | The InstanceID value SHALL indicate the application identifier, as defined by the format definition of the application. For example, Error! Reference source not found. defines an instanceID. |
| Version | var char (32) | No | The Version value SHALL indicate the application version, as defined by the format definition of the application. |

MediaDevice Entity

| Name | Data Type | Nullable | Documentation |
|---|---|---|---|
| DeviceID | int(10) | No | Unique identifier for the media device. This is the primary key. |
| AnonDeviceID | var char (255) | No | The AnonDeviceID value SHALL be a GUID Error! Reference source not found. that indicates a unique device. All events associated with a specific processing device, i.e., STB, TV, tablet, etc., will be associated with a MediaDevice entity with the same AnonDeviceID. This value does not represent, nor can it be externally associated with, a specific household or viewer. Devices with multiple tuners are represented with a single AnonDevice value, as associating events with tuners or other sub-components of presentation is not of direct value. |
| ServiceProvider | var char (255) | No | The ServiceProvider value SHALL be an unbounded String indicating the Service Provider, i.e., cable operator, who is providing the service associated with the associated media events. |
| DeviceCategory | tinyint | No | The DeviceCategory value SHALL indicate the broad category to which the device belongs. Allowable values are constrained to the following enumeration:<br>0 = other<br>1 = Legacy cable set-top box<br>2 = Tru2Way device<br>3 = PC<br>4 = tablet<br>5 = mobile<br>6 = "smart" TV |
| VideoPlayer | varchar (255) | No | The VideoPlayer value SHALL be an unbounded String indicating the video presentation environment. Examples include Apple QuickTime ™, Microsoft Silverlight ™, and Adobe Flash ™. |

Figure 9:
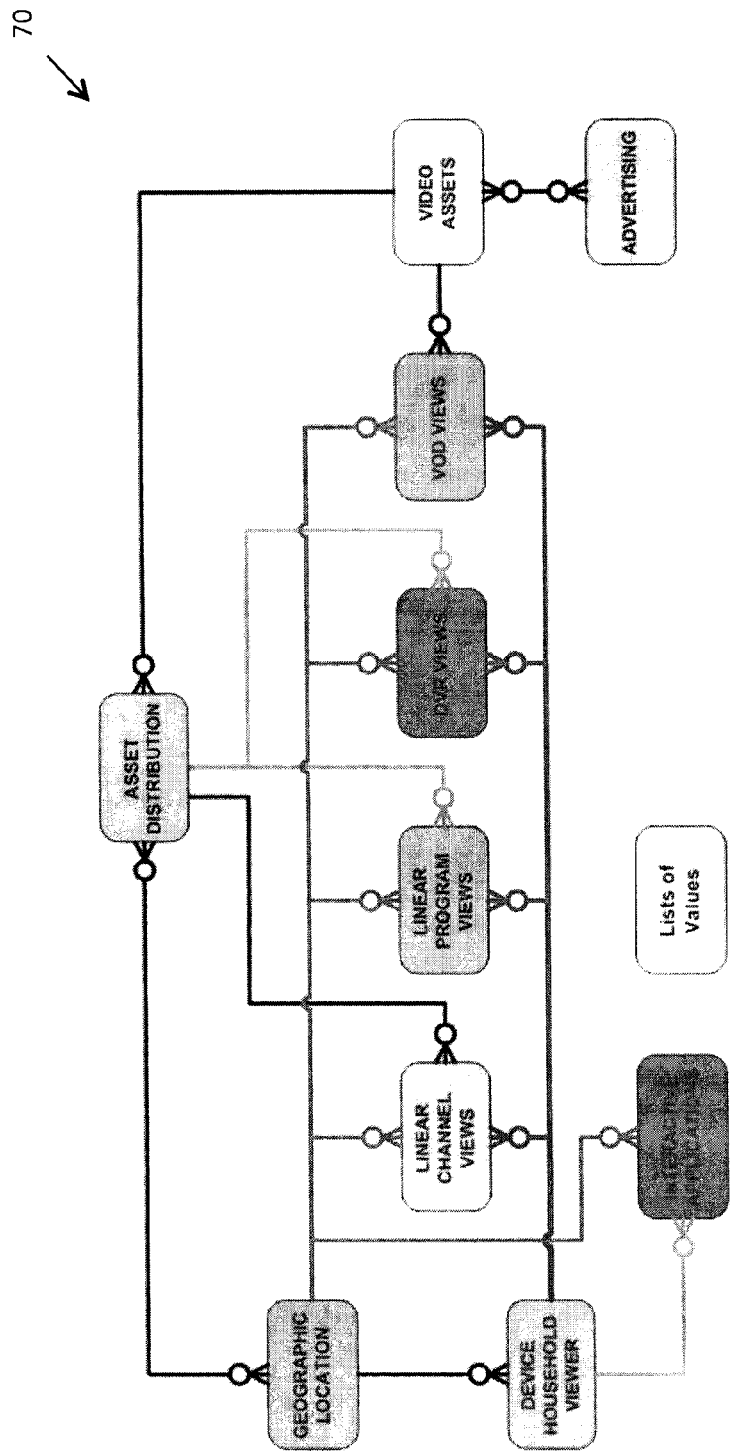
FIG. 9 illustrates a diagram of the MMDM from a conceptual level entity-relationship diagram in accordance with one non-limiting aspect of the present invention.

FIG. 9 illustrates a diagram 70 of the MMDM from a conceptual level entity-relationship diagram in accordance with one non-limiting aspect of the present invention. The diagram defines data composed of interaction (media) events combined with enrichment data such as subscriber, programming, demographics, and geographic area data. At this point in the lifecycle, discrete media events have been correlated into viewing sessions, which can then be correlated with programming, resulting in viewing impressions. Aggregating the MMDM data using various summarization criteria can generate audience measurement metrics. The conceptual model presents the tables and relationships without detailing the specific definitions of the tables. This model may be useful in mapping use cases and requirements onto data models. The conceptual model may be realized in a logical data model that presents the definitions of the tables.

MMDM Entity Descriptions:

| MMDM Subject Area | Subject Area Description |
|---|---|
| Geographic Location | The tables in this subject area define the types and values of geographic locations. Examples include Zip Code, Designated Market Area, Census Tract, and other definitions. Ideally, user interactions and viewing of video assets should be associated with geographic locations. |
| Device Household Viewer | The tables in this subject area define de-identified households, viewers, devices and associated demographics. |
| Asset Distribution | The tables in this subject area define the delivery of video assets across mediums. These tables also associate distribution of the assets with the geographic location. |
| Linear Channel Views | The tables in this subject area capture viewing measurement of channels including tuning into and away from channels. |
| Linear Program Views | The tables in this subject area capture viewing measurement of programs that are distributed on the channels. |
| DVR Views | The tables in this subject area capture measurement of viewing programs recorded using DVR. |
| VOD Views | The tables in this subject area capture measurement of viewing programs distributed using the VOD platform. |
| Interactive Applications | The tables in this subject area capture measurement of user engagement with interactive applications. For example, applications developed using the EBIF and tru2way frameworks. |
| Video Assets | The tables in this subject area define the assets, portions of assets (segments), and links to aired programs. These contain the building blocks for assembling video assets including advertising into airable/viewable programs. |
| Advertising | The tables in this subject area link the video assets and viewing measures to the advertising assets. Advertising assets include campaigns, and placement opportunities. |

Figure 10:
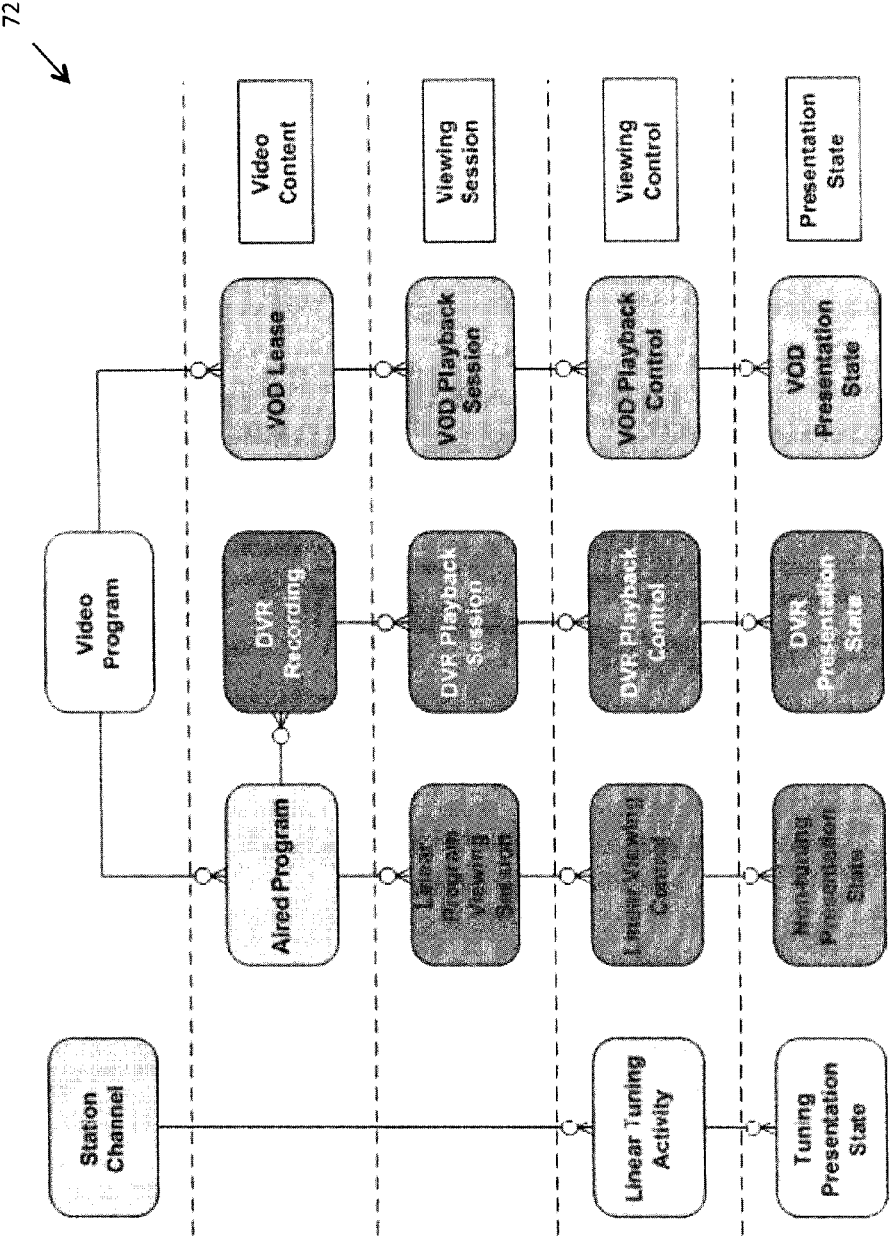
FIG. 10 illustrates a diagram of a measurement viewing model of the MMDM tables in accordance with one non-limiting aspect of the present invention.

FIG. 10 illustrates a diagram 72 of a measurement viewing model of the MMDM tables in accordance with one non-limiting aspect of the present invention. The diagram 72 is shown for exemplary non-limiting purposes to follow a common pattern across channel, program, DVR, and VOD viewing. The layers in the diagram may include: Video Content Layer—Reference to the video content (e.g., VOD Lease, DVR Recording, or Aired Program); Viewing Session Layer—Reference to watching the video content (e.g., VOD and DVR playback or viewing of the aired program); Viewing Control Layer—Reference to the play controls while watching the video content (e.g., play, pause, FF, RW, stop, tune, etc.); and Presentation State Layer—Reference to the presentation state while watching the video content (e.g., volume up/down, mute, split, etc.)

The IMMM identity and event data provided to vendors and otherwise generated in accordance with the present invention may include various pieces of metadata, including one or more of the data types reference below with respect to corresponding entity descriptors.

GEOGRAPHIC_AREA_TYPE Entity

Contains the definitions of the various types of geographic areas. Examples include Zip Code, Designated Market Area (DMA), SysCode (AdZone), and Census Tract.

| Name | Data Type | Nullable | Documentation |
|---|---|---|---|
| GEO_AREA_TYPE_ID | int(10) | No | Unique identifier for geographic area types. |
| GEO_AREA_TYPE | varchar (16) | No | Geographic area types include identifiers such as Zip Code, Designated Market Area (DMA), US Census Tract, and others. |
| GEO_AREA_DESC | varchar (40) | No | Description for the geographic area type. |
| GEO_AREA_USAGE | varchar (128) | Yes | Recommendations or general usage for the type. |
| GEO_AREA_TYPE_MNEMONIC | varchar (6) | No | Geographic Area MNEMONIC is a 6 char descriptor of the geographic area type. This is for convenience for filtering and reporting. |

STATION_GEOGRAPHIC_AREA Entity

Intersection table mapping the station delivering video content to the geographic area receiving the content.

| Name | Data Type | Nullable | Documentation |
| --- | --- | --- | --- |
| STATION_ID | int(10) | No | Unique station identifier. |
| GEO_AREA_CODE_ID | int(10) | No | Unique geographic area identifier. |

GEOGRAPHIC_AREA_RELATIONSHIP Entity

This associates geographic area definitions into grouping relationships. For example, this can associate a Zip Code, DMA, and Census Tract to define a geographic area as a collection of type definitions.

| Name | Data Type | Nullable | Documentation |
| --- | --- | --- | --- |
| GEO_AREA_CODE_ID_PARENT | int(10) | No | Reference to the parent geographic area code. |
| GEO_AREA_CODE_ID_CHILD | int(10) | No | The children in the geographic area grouping. |
| GEO_RELATIONSHIP_TYPE | varchar (32) | No | This would contain a type such as "DMA-ZIP." |

STATION_CHANNEL Entity

Station Channel contains the combinations of stations, channels, networks, and services on which programs are delivered to the viewers.

| Name | Data Type | Nullable | Documentation |
| --- | --- | --- | --- |
| STATION_ID | int(10) | No | Unique identifier for the station delivering the video content to the viewer. |
| STATION_MAP_SOURCE | varchar (12) | No | The information source of the Station to Channel mapping (e.g., Tribune). |
| CALL_SIGN | varchar (10) | No | The acronym (call sign) for the Station; Station Call letters. |
| STATION_LONG_NAME | varchar (50) | No | The full name of a Station. |
| NETWORK_ID | int | No | A unique identifier for a Network. |
| NETWORK_LONG_NAME | varchar (50) | No | The name of a Network. |
| EIDR_VIDEO_SERVICE_ID | varchar (64) | Yes | Contains the entertainment ID registry number for the station. |

STATION_CHANNEL_PROGRAM Entity

Associates the aired programs to the station/channel/network on which the programs are aired.

| Name | Data Type | Nullable | Documentation |
| --- | --- | --- | --- |
| STATION_ID | int(10) | No | Unique identifier for the station on which the program was aired. |
| AIRED_PROGRAM_ID | int(10) | No | Unique identifier for the aired program. |

GEOGRAPHIC_AREA_CODE Entity

Geographic Area Code contains the specific values associated to the geographic area types. For example this may include a list of Zip Codes or DMAs.

| Name | Data Type | Nullable | Documentation |
| --- | --- | --- | --- |
| GEO_AREA_CODE_ID | int(10) | No | Geographic Area Code ID is the unique internal identifier of this geographic area. |
| GEO_AREA_TYPE_ID | int(10) | No | Foreign key back to the geographic area type. |
| GEO_AREA_CODE_VALUE | varchar (12) | No | Actual associated value for the geographic area type. For example, if the type is Zip Code, the value m ay be a 5 or 9 digit Zip Code (e.g., "80027-1234"). |
| GEO_AREA_DESC | varchar (32) | Yes | The description associated with the value of the geographic code type. For example, with a type of Zip Code, and a value of "80027", the description could be "Louisville, CO, USA". |
| GEO_AREA_CODE_MNEMONIC | varchar (12) | No | Geographic Area Code Mnemonic is a 6-character descriptor of the geographic area code. This is for convenience for filtering and reporting. |

AIRED_PROGRAM Entity

Aired Program records information on when this video program aired. This could be the original airing or a rerun. The same Video Program may run multiple times in one day. If the Video Program does not allow targeted content, then we assume that the same content (including advertisements) was played each time the Video Program aired.

| Name | Data Type | Nullable | Documentation |
| --- | --- | --- | --- |
| AIRED_PROGRAM_ID | int(10) | No | Aired Program ID is the unique internal identifier of this video program. |
| VIDEO_PROGRAM_ID | int(10) | No | Video Program ID provides a link to the video program which is being aired. |
| PROGRAM_TITLE | varchar (255) | No | Contains the title of the aired program. |
| PROGRAM_AIRING_BEG_LOCAL_DT | datetime | No | Program Airing Begin Local Date Time identifies the date and time this program aired, expressed in local time. This may also be known as Program scheduled start date time. |

-continued

| Name | Data Type | Nullable | Documentation |
|---|---|---|---|
| PROGRAM_AIRING_END_LOCAL_DT | datetime | No | Program Airing End Local Date Time identifies the date and time this program finished airing, expressed in local time. This may also be known as Program scheduled end date time. |
| PROGRAM_AIRING_BEG_UTC_DT | datetime | No | Program Airing Begin UTC Date Time identifies the date and time this program aired, expressed in UTC time. This may also be known as Program scheduled start date time. |
| PROGRAM_AIRING_END_UTC_DT | datetime | No | Program Airing End UTC Date Time identifies the date and time this program finished airing, expressed in UTC time. This may also be known as Program scheduled end date time. |
| EIDR_CONTENT_ID | varchar (64) | Yes | EIDR is a universal unique identifier system for movie and television assets. From top level titles, edits, and DVDs, to encodings, clips and mash-ups, EIDR provides global unique identifiers for the entire range of audiovisual object types that are relevant to entertainment commerce. (Source: EIDR.org) |

25
INTERACTIVE_APP_TEMPLATE Entity
Interactive Application Template contains the definition of the application template.

| Name | Data Type | Nullable | Documentation |
|---|---|---|---|
| INTERACTIVE_APP_TEMPLATE_ID | int(10) | No | Unique identifier for the interactive application template. |
| APPLICATION_SHORT_NAME | varchar (40) | No | Short name of the interactive application. |
| APPLCATION_LONG_NAME | varchar (120) | No | Long name of the interactive application. |
| APP_LINKS_TO_VIDEO_CONTENT_IND | char(1) | Yes | Application Links to Video Content Indicator is a Y/N field that specifies whether or not this Interactive Application is linked to the Video Content that is being aired on the screen. Examples: A Sports Application on ESPN may likely be linked to the content airing. A recommendation engine is not likely linked to particular video content. Y = Interactive Application is linked to content N = Interactive Application is not linked to content |
| DESTINATION_URL | varchar (100) | Yes | Verify this: Destination URL is the Uniform Resource Locator to which the application response information will be sent. So in the case of voting and polling, this is the web address to which the STB will direct the voting information. |
| ORGANIZATION_ID | int | No | Identifier of the organization originating the interactive application. |
| APPLICATION_ID | int | No | Application ID is the unique identifier assigned to the application. This is not the database internal ID, but an industry recognized ID for this application. |
| HTTP_POST_PROTOCOL_VER | varchar (10) | No | Hyper Text Transport Protocol Post Protocol Version records the version of the HTTP protocol used in sending messages from the STB to the collection server. This allows the collection server to know how to interpret the message. |
| HTTP_POST_FORMAT_CODE | varchar (10) | No | Hyper Text Transport Protocol Post Format records the format of the HTTP protocol used in sending messages from the STB to the collection server. This allows the |

-continued

| Name | Data Type | Nullable | Documentation |
|---|---|---|---|
| | | | collection server to know how to interpret the message. |
| APPLICATION_DESC | varchar (255) | Yes | Contains the description of the interactive application. This generically identifies what kind of Interactive Application is being run. Example: College Football Voting and Polling. |
| BOUND_UNBOUND_IND | char(1) | No | Indicates whether an interactive application is linked (bound) to the live channel. Bound example: User experience is bound to the entertainment content and exits when content changes (e.g., Request For Information—RFI). Unbound example: The application can continue to run outside the scope of the content in which it was launched (e.g., eBay alerts). |
| APPLICATION_MAJOR_VER_NBR | varchar (10) | Yes | Major version number for the interactive application. |
| APPLICATION_MINOR_VER_NBR | varchar (10) | Yes | Minor version number for the interactive application. |
| APPLICATION_OPT_IN_IND | char(1) | Yes | Application Opt In Indicator specifies whether or not the user must opt in to the application. Y means that the user must opt in for the application to run for them. N means the application can launch without being requested by the user. |
| CONFIG_PARM_USAGE | varchar (200) | Yes | Configuration Parameter Usage is a narrative field explaining the usage of the configuration parameters. |
| CONFIG_PARM_DESC | varchar (200) | Yes | Configuration Parameter Description records any descriptive information about the configuration parameters. |
| CONFIG_PARM_NAME_USAGE_PAIR | varchar (1000) | Yes | Configuration Parameter Name Usage Pair records a set of name-value pairs, which provide configuration information for the Application Template. |

HOUSEHOLD_GEOGRAPHIC Entity

Intersection table mapping the household to its geographic data.

| Name | Data Type | Nullable | Documentation |
|---|---|---|---|
| HOUSEHOLD_ID | int(10) | No | Anonymized (de-identified) household identifier. |
| GEO_AREA_CODE_ID | int(10) | No | Unique geographic area identifier. |

APPLICATION_SESSION Entity

Application Session records the instantiation or invocation of an Interactive Application by a Device Household Viewer. The Interactive Application may be associated with any of:
  Aired Program ID when the viewer is viewing Linear Content (Linear Tuning Activity or Linear Program Viewing Session) or recording content (DVR).
  Video Program ID when the viewer is viewing a Video On Demand asset where there is only a Video Program ID.
  Neither Aired Program nor Video Program; an example may be a Recommendation application. The EIDR is not a sufficient link, because the same EIDR may occur in several aired programs and thus we could not use EIDR to distinguish one aired program from another.

| Name | Data Type | Nullable | Documentation |
|---|---|---|---|
| APPLICATION_SESSION_ID | bigint (20) | No | Application Session ID records the unique identifier for application session. |
| INTERACTIVE_APP_INSTANCE_ID | int(10) | No | Interactive Application Instance ID records the unique identifier assigned to this instance (e.g., execution) of the Interaction Application. This value identifies the Interactive Application Instance that the user is running. Many Application Sessions may point to the same Interactive Application Instance, for example 10,000 people may be using a Voting and Polling application for a football game. |

| Name | Data Type | Nullable | Documentation |
|---|---|---|---|
| DEVICE_HOUSEHOLD_VIEWER_MAP_ID | int(10) | No | Household Device Viewer ID provides a link to the DHV_Map (Household Device Viewer Mapping) table, which identifies the Household, Viewer, and Device associated with this Interactive Session. |
| GEO_AREA_CODE_ID | int(10) | Yes | Geographic area code identifier records the geographic area in which the interactive application session began. |
| STATION_ID | int(10) | No | Station ID points to the station_channel table as a foreign key reference. Provides link to call_sign, EIDR, etc. |
| TUNER_ID | tinyint | No | Device Tuner ID identifies the tuner used during this application session. This is important to differentiate between multiple sessions that may be created at the same time from the same Household Device Viewer. |
| SESSION_BEG_LOCAL_DT | datetime | No | Session Begin Local Date Time records the date and time of when this application session began, expressed in local time. The viewer may start the session at the same time as the program or at any point during the program. |
| SESSION_END_LOCAL_DT | datetime | No | Session End Local Date Time records the date and time of when this application session ended, expressed in local time. |
| SESSION_BEG_UTC_DT | datetime | No | Session Begin UTC Date Time records the date and time of when this application session began, expressed in UTC time. The viewer may start the session at the same time as the program or at any point during the program. |
| SESSION_END_UTC_DT | datetime | No | Session End UTC Date Time records the date and time of when this application session ended, expressed in UTC time. |
| INITIATION_CODE | smallint | No | Session Initiation Code identifies what action initiated the session. Examples include: user invoked via menu; system prompted user, etc. |
| TERMINATION_CODE | smallint | No | Session Termination Code identifies a reason code for a session terminating. Examples include: Tune-out, User Changed channel, User exited session, End of program. |
| AIRED_PROGRAM_ID | Datatype: int Nullable: Yes Background: The field INTERACTIVE_APP_TEMPLATE.APP_LINKS_TO_VIDEO_CONTENT_IND specifies whether or not the Interactive Application links to Video Content. Read the following with that in mind. Aired Program ID identifies the aired program that the viewer was viewing when the Application Session was instantiated. This value may be captured whether or not the Interactive Application Links to the Content. If the Interactive Application does NOT link to the content, then the Aired Program ID value can be used to enable measuring other activity that was occurring when the user was consuming the content specified in the Aired Program ID. During measurement, this additional activity can reduce the viewing score that an ad earns. For example, if the user is interacting with a recommendation application when an ad appears on the channel, this may decrease the score of any ad viewing. If the Interactive Application does link to the content (to the program that was airing), then the Aired Program ID value can be used to measure Interactive Application activity that was occurring when the user was consuming the content specified in the Aired Program ID. During measurement, this additional Interactive Application activity can increase the viewing score because we can determine that the viewer is very engaged with the content since the application was related to the content. A NULL value indicates that there was not an Aired Program present. This may happen in the case of VOD viewing. | | |

| Name | Data Type | Nullable | Documentation |
|---|---|---|---|
| VIDEO_ PROGRAM_ID | Datatype: int Nullable: Yes Background: The field INTERACTIVE_APP_TEMPLATE.APP_LINKS_TO_VIDEO_CONTENT_IND specifies whether or not the Interactive Application links to Video Content. Read the following with that in mind. Video Program ID identifies the video program that the viewer was viewing when the Application Session was instantiated. This value may be captured whether or not the Interactive Application Links to the Content. If the Interactive Application does NOT link to the content, then the Video Program ID value can be used to enable measuring other activity that was occurring when the user was consuming the content specified in the Video Program ID. During measurement, this additional activity can reduce the viewing score that an ad earns. For example, if the user is interacting with a recommendation application when an ad appears on the channel, this may decrease the score of any ad viewing. If the Interactive Application does link to the content (to the program that was airing), then the Video Program ID value can be used to measure Interactive Application activity that was occurring when the user was consuming the content specified in the Video Program ID. During measurement, this additional Interactive Application activity can increase the viewing score because we can determine that the viewer is very engaged with the content since the application was related to the content. A NULL value indicates that there was not a Video Program present. | | |
| VOD_VIEWING_ INDICATOR | char(1) | Yes | Video On Demand Viewing Indicator specifies whether or not the viewing activity that was occurring this Application Session happened during a VOD viewing session. Values include: Y = This happened during a VOD session. In this case, the Aired Program ID should be null. During measurement, we would not try to associate this viewing to an Aired Program. N = This happened during a non-VOD session so it happened when Linear or DVR was occurring. During measurement, we can link this activity to an Aired Program. |

INTERACTIVE_APP_INSTANCE Entity
Interactive Application Event Instance records the actual event instance.

| Name | Data Type | Nullable | Documentation |
|---|---|---|---|
| INTERACTIVE_ APP_ INSTANCE_ID | int(10) | No | Interactive Application Instance ID records the unique identifier assigned to this instance (i.e., execution) of the Interactive Application. |
| INTERACTIVE_ APP_ TEMPLATE_ID | int(10) | No | Unique identifier for the interactive application template. Interactive Application ID links back to the Interactive Application Template where the basic information about the Interactive Application is recorded. |
| SAFI_ PROGRAM_ EVENT_ IDENTIFIER | varchar (128) | Yes | PEID, or Programmed Event ID: This field is a unique identifier that ties to the content (program or commercial spot) that is being enhanced. A campaign that enhances several different programs or commercial spots will have one PEID for each scheduled event (e.g., a six-week enhancement to a weekly program would have six different PEIDs). |
| INTERACTIVE_ APP_ INSTANCE_ DESC | varchar (250) | Yes | Interactive Application Instance Description records the description of this instance (i.e., execution) of the Interaction Application. This may be the name of the college football game. For example: Texas vs. Oklahoma. |
| AD_ PLACEMENT_ OPPORTUNITY_ ID | int | Yes | Ad placement opportunity ID records the unique internal identifier assigned to the ad placement opportunity related to this Interactive Application Instance. |
| CONFIG_PARM_ NAME_VALUE_ | varchar (1000) | Yes | Configuration Parameter Name Value Pair records a set of name value pairs, which provide |

| Name | Data Type | Nullable | Documentation |
|---|---|---|---|
| PAIR | | | configuration information for the Application Instance. For this instance of the Application, this records the actual configuration values for the CONFIG_PARM_NAME_USAGE_PAIR defined in the INTERACTIVE_APP_TEMPLATE. These may be thought of as Application Settings. |

VIDEO_PROGRAM Entity

Video Program records information about a video program. A Video Program is some video content such as a news cast or a sporting event including any ad breaks that are contained within the program. The Video Program may start and end with ads, and may have ads anywhere within the content.

| Name | Data Type | Nullable | Documentation |
|---|---|---|---|
| VIDEO_PROGRAM_ID | int(10) | No | Video Program ID is the unique internal identifier of this video program. |
| PROGRAM_TYPE_CODE | varchar (16) | No | Video Program Type Code records the type of this video program. Examples: News, Weather, Movie, Sport, Series. |
| PROGRAM_DURATION_IN_SECONDS | medium int | No | Program Duration In Seconds records the duration of this program, measured in seconds. |
| PROGRAM_GENRE_CODE | varchar (8) | No | Video Program Genre Code records the genre of this video program. |
| PROGRAM_RATING_CODE | varchar (4) | No | Video Program Rating Code records the rating code of this video program. |
| INDUSTRY_ASSET_ID | varchar (20) | Yes | Industry Asset ID records a standard, commonly accepted industry ID for this video program. |
| INDUSTRY_PROGRAM_ID | varchar (20) | Yes | Industry Program ID records a standard, commonly accepted industry ID for this video program. Each program has a unique value for Industry Program ID. In the case of a Series, each episode in the series has a unique Industry Program ID, but all the episodes in the Series share the same Program Series ID. |
| PROGRAM_TITLE | varchar (50) | No | Video Program Title records the name of this video program. |
| PROGRAM_DESC | varchar (255) | Yes | This is the long description of the video program. |
| PROGRAM_SERIES_ID | varchar (20) | Yes | Program Series ID records the series identifier for this program. This is the commonly used identifier of this series when the program is an episodic program. This may also be known as Industry Series ID. Collecting series information allows comparisons over time to see if series viewership is dropping off. |
| ORIGINAL_AIR_DATE | datetime | Yes | Date and time the video program originally aired. |
| ORIGINAL_AIR_SEASON | varchar (16) | Yes | The season this program originally aired. |
| ORIGINAL_AIR_EPISODE | varchar (16) | Yes | The episode in the season this program originally aired. |
| EIDR_CONTENT_ID | varchar (64) | Yes | EIDR is a universal unique identifier system for movie and television assets. From top level titles, edits, and DVDs, to encodings, clips and mash-ups, EIDR provides globally unique identifiers for the entire range of audio-visual object types that are relevant to entertainment commerce. (Source: EIDR.org) |

DYNAMIC_SEGMENT Entity

Dynamic Segment records information about a video asset, which is dynamically inserted to this segment at airing. For example, when a video allows dynamic ad insertion, this identifies the dynamic (targeted) video asset that was inserted into the segment. The ultimate goal is that for each Video Program Segment, for each viewing session of a particular Video Program Airing, we capture what Ad was delivered to the viewer. An interim step until such detailed data is available is to record only the Video Program Segment, the Ad was delivered (but not to which viewer), and the Video Program Airing data.

| Name | Data Type | Nullable | Documentation |
|---|---|---|---|
| DYNAMIC_SEGMENT_ID | bigint(20) | No | Unique identifier of a dynamic segment. |
| AIRED_PROGRAM_ID | int(10) | No | Video Program Airing ID links to the parent Video Program Airing, which identifies the airing of the video program in which this asset appeared. This will be present for Linear and DVR. It will NOT be present for VOD. |
| VIDEO_PROGRAM_SEGMENT_ID | int(10) | No | Video Program Segment ID links to the parent Video Program Segment, which defines the video program segment into which this dynamic content is being inserted. |
| VIDEO_ASSET_ID | int(10) | No | Video Asset ID links to the Video Asset table to identify that asset (ad) that was dynamically inserted into this segment. |
| AD_PLACEMENT_ID | int(10) | Yes | Ad Placement ID provides the link to placement of the ad in relation to the advertising opportunity. |
| SAFI_CIP_AD_CAMPAIGN_ID | int(10) | No | This records the campaign ID under which the ad was placed in the Dynamic Segment. The same ad can be used in multiple campaigns. When tracking viewership of an ad, we need to know the campaign under which the ad was presented to the viewer. If we do not capture the campaign, then we will end up recording Households that viewed the ad, but it will be apart from the context of the campaign and thus will not be useful for measuring campaign performance. |
| INTERACTIVE_APP_INSTANCE_ID | int(10) | Yes | Interactive Application Instance ID records the identifier of this interactive application instance. As an example, this dynamic segment may have a truck commercial that varies depending on the city such that a viewer in Denver may get one instance of the application while a viewer in Fort Collins may get a different version of the application. Note: This information does not control the measurement activity. Instead, it can be used to identify a possible reason for the viewing results. |
| AD_PLACEMENT_BASIS_LINK | varchar(255) | Yes | Ad Placement Basis Link provides a link to the data which explains why this ad was placed in this Dynamic Segment. What group of viewers were being targeted with this ad. This is the Placement Decision Notification message/information. |

DEVICE_DEFINITION Entity

Contains the manufacturer's definitions of the viewing devices. Examples include a set-top box, a tablet device, a smartphone, an Internet protocol TV, a personal computer, or any other type of device able to view video content.

| Name | Data Type | Nullable | Documentation |
|---|---|---|---|
| DEVICE_DEF_ID | int(10) | No | Video Viewing Device Definition ID is the internal identifier assigned to this video viewing device definition. |
| MODEL_NUMBER | varchar(50) | No | Model number of the viewing device. |
| DEVICE_TYPE | varchar(8) | No | The type of the viewing device (e.g., set-top). |
| MANUFACTURER | varchar(16) | No | Manufacturer of the viewing device. |
| IS_HIGH_DEFINITION_IND | char(1) | No | Flag indicating if the device is enabled for high-definition video content. |
| IS_INTERACTIVE_ | char(1) | No | Flag indicating if the viewing device is enabled for interactive |
| TV_IND | | | television viewing agents. |
| INTERACTIVE_TV_AGENT_ID | varchar(16) | Yes | Identifier of the ITV agent (e.g., EBIF, T2W/OCAP, MHP, JavaTV) if the viewing device is enabled for ITV. |
| IS_DVR_IND | char(1) | No | Flag indicating if the viewing device is enabled for Digital Video Recorder capabilities. |
| IS_VOD_IND | char(1) | No | Flag indicating if the viewing device is enabled for video on demand capabilities. |

APPLICATION_CONTROL Entity

This entity captures the part of the Interactive Application with which the user is interacting (the Interactive Application Event) along with the user response to that Interactive Application Event. Example: The user is interacting with the App Event for Voting and they have chosen player "Smith" as their choice.

| Name | Data Type | Nullable | Documentation |
|---|---|---|---|
| APPLICATION_ CONTROL_ID | bigint(20) | No | Application Control ID is the unique identifier for this Application Control record. |
| APPLICATION_ SESSION_ID | bigint(20) | No | Application Session ID links to the parent Application session which provides context for this application session. |
| APP_EVENT_ INSTANCE_ID | int(10) | No | Application Event Instance ID links to the INTERACTIVE_ APP_EVENT_INSTANCE. APP_EVENT_INSTANCE_ID which provides the definition information related to what the user is doing in this part of the Application. Example: The Interactive App Event Instance may define "voting". By linking to that value, we now know that this Application Control record has to do with voting. The link to the Application Session record identifies the context for the voting, such as the football game between Texas and Oklahoma. |
| CONTROL_ BEG_SEC_ FROM_ TRUE_BEG | mediumint | No | Application Mode Beg Second From True Beginning (of Video Program) identifies the position in the actual program content of where this activity occurred. Having the actual position in the content allows us to map Application activity onto Video Content so that we can determine where in the content the user was when they were using this application. Example: The Application may have been a shopping app initiated just after a car ad appeared. Or, the Application may have been a Sports Scoreboard initiated during inning 4 of a baseball game. |
| CONTROL_ END_SEC_ FROM_ TRUE_BEG | mediumint | No | Application Mode End Second From True Beginning (of Video Program) identifies the position in the actual program content where this activity ended. Having the actual position in the content allows us to map Application activity onto Video Content so that we can determine where in the content the user was when they were using this application. Example: The Application may have been a shopping app initiated just after a car ad appeared and then terminated 40 seconds later. The Application may have been a Sports Scoreboard that was initiated during inning 4 of a baseball game, and kept active until inning 7. |
| APP_EVENT_ NAME_VALUE_ PAIR_RESP | varchar (250) | Yes | Application Event Name Value Pair Response records the viewer's response to the prompt or displayed choice provided in the application. By capturing this as a Name-Value pair, we provide the flexibility to record both parts of the data (question and answer) or (prompt and answer). |

INTERACTIVE_APP_EVENT_TEMPLATE Entity
Interactive Application Event Template provides the list of templates for instances of interactive apps.

| Name | Data Type | Nullable | Documentation |
|---|---|---|---|
| APP_EVENT_ TEMPLATE_ID | int(10) | No | Interactive application Event Template ID is a unique internal (database) numeric identifier assigned to this event. |
| INTERACTIVE_ APP_ TEMPLATE_ID | int(10) | No | Interactive application template ID links to the parent Interactive Application Template. |
| APP_EVENT_ FUNCTION_ CODE | varchar (12) | Yes | Used to specify: Begin or Initiate the Application Exit or to Terminate the Application. |
| INTERACTIVE_ APP_EVENT_ DESC | varchar (250) | Yes | Records a description of the Event. Examples: Initiated App, Initiated an Order, Completed a Purchase, Exited via Channel Change, Exited via Cancel Button, etc. |
| APP_ EVET_CODE | varchar (12) | Yes | Application Event Code records the mnemonic code assigned to this Application Event. |

-continued

| Name | Data Type | Nullable | Documentation |
|---|---|---|---|
| APP_EVENT_SEQUENCE_NBR | tinyint | Yes | Application Event Sequence Number provides the ordering for the events in this Interactive Application. |
| EVENT_ALLOWS_VIEWER_INPUT_IND | char(1) | Yes | Application Event Allows Viewer Input Indicator is a yes/no flag that specifies whether or not the user can respond or enter input in response to this event.<br>Y = Viewer input is allowed<br>N = Viewer input is not allowed. |
| EVENT_INITIATED_BY_CODE | char(1) | Yes | Event Initiated By Code records how this event is initiated. Values include:<br>U = User initiates the event, or user responds to the event that the server does<br>S = Server initiates the event<br>E = Either user or server may initiate the event. |

INTERACTIVE_APP_EVENT_INSTANCE Entity

Interactive Application Event Instance records the actual event that was presented to the viewer along with the options that go with that event.

| Name | Data Type | Nullable | Documentation |
|---|---|---|---|
| APP_EVENT_INSTANCE_ID | int(10) | No | Primary key, unique internal identifier for the record. |
| INTERACTIVE_APP_INSTANCE_ID | int(10) | No | Interactive Application Instance ID records the unique identifier assigned to this instance (i.e., execution) of the Interaction Application. |
| APP_EVENT_TEMPLATE_ID | int(10) | No | Interactive application Event Template ID is a unique numeric identifier assigned to this event. |
| APP_EVENT_DISPLAYED_TEXT | Datatype: varchar(200)<br>Nullable: Yes<br>Application Event Displayed Text records the text that was displayed to the viewer when this event ran as part of the Interactive Application Instance.<br>Examples:<br>For Voting and Polling Interactive Prompt: "Welcome to the GM sponsored college football game of Texas vs. Oklahoma"<br>Preference Question: Favorite Team ("Are you rooting for Texas or Oklahoma?")<br>Confirmation of Favorite Team ("Get Ready to Vote" overlay)<br>Vote/Poll Question: For Texas, "Which running back will get the most yards?"<br>For Oklahoma: "Which receiver will catch the most passes?"<br>"Thank You" overlay<br>Vote/Poll Results ("Welcome Back" Message During or End of Game Overlays) | | |
| NAME_VALUE_PAIR_CHOICES | varchar(1000) | Yes | Name Value Pair Choices records all of the available choices that the user is presented with for answering the displayed text. |

VIDEO_ASSET Entity

Video Asset represents a video asset such as an advertisement that may be viewed by a video asset viewing device. In the case of a Non-Targeted Ad, the analyst can readily identify what ad was aired at this point in the Video Program. In the case of a Targeted Video Asset such as a Targeted Ad, there are many variables that control what ad was actually directed to the specific video asset viewing device, so unless the ad decision system specifically records what ad was sent to each device, there is likely no way to know that. Even if one could know the type of ad that was targeted based on viewer demographic and geographic data, there is no way to determine what particular ad was placed in the specific time slot. Because of this fact, we would do well to measure the viewing seconds of targeted vs. non-targeted content with the objective of determining whether the targeted or non-targeted content earns more viewing time.

| Name | Data Type | Nullable | Documentation |
|---|---|---|---|
| VIDEO_ASSET_ID | int(10) | No | Video Asset ID is a unique numeric identifier assigned to this video asset. |
| DURATION_IN_SECONDS | mediumint | No | Duration in seconds records the duration of this video asset in seconds. For an ad, this may be 30 or 60 seconds. For a newscast, it may be 1800 |

| Name | Data Type | Nullable | Documentation |
|---|---|---|---|
| | | | seconds if the commercials are baked into the content. |
| ASSET_TYPE | varchar(8) | No | Video Asset Type identifies the type of the video asset such as Content, Ad, etc. The service provider may provide a reference table for this. |
| ASSET_CONTENT_SOURCE_CODE | varchar(8) | No | Video Asset Content Source Code identifies the source of the content (TV Studio, Webcast, YouTube, etc.). The service provider may provide a reference table for this. |
| PRODUCT_TYPE_CODE | varchar(8) | Yes | Product Type Code records a code that identifies the type of product being advertised, if this is an ad. The Provider may define a reference table for this data. |
| INDUSTRY_ASSET_ID | varchar(20) | Yes | Industry Asset ID records a standard, commonly accepted industry ID for this video asset. |
| INDUSTRY_PROGRAM_ID | varchar(20) | Yes | Industry Program ID records a standard, commonly accepted industry ID for this video asset. |
| ENHANCED_CONTENT_IND | char(1) | Yes | Enhanced Content Indicator is used to identify assets, which contain enhanced content such as interactive content or EBIF ads. |
| ASSET_TITLE | varchar(128) | No | Video Asset Title records the title of this video asset. |
| EIDR_CONTENT_ID | varchar(64) | Yes | EIDR is a universal unique identifier system for movie and television assets. From top level titles, edits, and DVDs, to encodings, clips and mash-ups, EIDR provides global unique identifiers for the entire range of audio visual object types that are relevant to entertainment commerce. (Source: EIDR.org) |
| ADVERTISING_ID_ORGANIZATION_ID | varchar(64) | Yes | Ad-ID is a Web-based system accessible 24/7 worldwide that generates a unique identifying code for each advertising asset, creating a capability to identify them across all media. (Source: Ad-ID. org) |

HOUSEHOLD Entity

The Household table contains household definitions.

| Name | Data Type | Nullable | Documentation |
|---|---|---|---|
| HOUSEHOLD_ID | int(10) | No | Household ID is the unique internal identifier of this household. |
| HOUSEHOLD_QUID | varchar(32) | No | Anonymized (de-identified) household identifier. |
| HOUSEHOLD_TYPE | varchar(16) | No | Household type. Examples include residential, multi-family, small business, commercial, etc. |
| EFF_FROM_DATE | date | No | Date the Household became active. |
| EFF_THRU_DATE | date | No | Date the Household stopped being active. |

VIDEO_PROGRAM_SEGMENT Entity

Video Program Segment defines a part of a video program, a segment of a video program. This may be the time when an ad aired or the time that defines a part of the program, such as an inning in a baseball game.

| Name | Data Type | Nullable | Documentation |
|---|---|---|---|
| VIDEO_PROGRAM_SEGMENT_ID | int(10) | No | Program Segment ID records the unique identifier assigned to this video program segment. |
| VIDEO_PROGRAM_ID | int(10) | No | Program ID provides a link to the parent video program. |
| SEG_ORDER_NUM | mediumint | No | Segment Order Number defines the position of this video segment within the program, e.g., 1, 2, 3. |
| SEG_BEG_HHMMSS_OF_PROGRAM | time | No | Segment Begin Time in HH:MM:SS format defines when in the program this segment begins. This is time from the beginning of the program, not time from the start of airing of this segment. Example: The program airs at 6:00 PM - this is not relevant. The segment defines an ad that airs exactly 10 minutes into the program. This value would be 00:10:00. |

-continued

| Name | Data Type | Nullable | Documentation |
|---|---|---|---|
| SEG_END_HHMMSS_OF_PROGRAM | time | No | Segment End Time in HH:MM:SS format defines when in the program this segment ends. This time defines when the program segment ends with time being measured from the beginning of the program.<br>Building on the example above, if the ad is one minute long, the segment would end at 00:10:59. |
| SEG_BEG_SECONDS_IN_PROGRAM | mediumint | No | Segment Begin Time Seconds in Program records the number of seconds from the start of the program at which this segment begins.<br>If an ad began at the start of the second minute, this would be 60. Counting begins at zero, so the first minute is from seconds 0 to 59. |
| SEG_END_SECONDS_IN_PROGRAM | mediumint | No | Segment End Time Seconds in Program records the number of seconds from the start of the program at which this segment ends.<br>If a 60-second ad began at the start of the second minute, and the end of the ad marked the end of the segment, this would be 119 (counting begins from 60, not 61). |
| ALLOW_TARGETING_DURING_SEG_IND | char(1) | No | Allow Targeting During Segment Indicator specifies whether or not targeted ads can be run during this segment.<br>Y = Yes<br>N = No |
| SEG_CONTENT_TYPE_CODE | char(2) | No | Segment Content Type Code records information about what kind of content is expected to air during this segment.<br>Example: AD = Advertisement; PC = Program Content. |
| SEGMENT_DURATION_IN_SECONDS | mediumint | No | Segment Duration in Seconds records the duration of this segment in seconds. |
| SEGMENT_DESC | varchar(64) | No | Segment Description records any description of this segment. |
| SEG_POSITION_NUM | smallint | No | Segment Position Number defines the position of this video segment within the program.<br>This is for future use in the measurement process. The usage can vary depending upon how the segments are defined. For example, positions may be 1, 7, 12, 22, whereas order will be 1, 2, 3 (sequential). |
| PROGRAM_SEGMENT_TYPE | varchar(3) | Yes | Map to Linear, VOD, iTV/ETV, IPTV, DVR, etc. |
| ALLOW_INTERACTIVE_APP_DUR_SEG_IND | char(1) | Yes | Allow Interactive Applications During Segment Indicator specifies whether or not an interactive application may be run during this segment.<br>Y = Yes<br>N = No |

APPLICATION_STATE Entity
Application state contains the viewing state and associated data for the application control.

| Name | Data Type | Nullable | Documentation |
|---|---|---|---|
| APPLICATION_STATE_ID | bigint(20) | No | Application state ID is a unique numeric identifier assigned to this application state. |
| APPLICATION_CONTROL_ID | bigint(20) | No | Application control ID links the application state to the application control. |
| STATE_BEG_SEC_FROM_TRUE_BEG | mediumint | No | Event Beginning (Starting) Offset Second from True Beginning records the number of seconds into the program at which the Application began to have the state shown in the App State Data.<br>Knowing this information, we can normalize viewing across the sessions done by numerous devices.<br>Example: If the session began at the exact start of the actual program, this would be zero. If the session began at the start of the third minute, this would be 120. The first two minutes of content would be in seconds 0 to 119. |

| Name | Data Type | Nullable | Documentation |
|---|---|---|---|
| STATE_END_SEC_FROM_TRUE_BEG | mediumint | No | Event Ending Offset Second from True Beginning records the number of seconds into the program at which the Application stopped having the state shown in the App State Data.<br>Example: If the session ended at the exact end of the actual program, this would be the number of seconds in the program, such as 1800 for a 30-minute program. If the session ended exactly ten minutes into the program, this would be 600. These values must be adjusted to account for starting the count at 0, so the values would be 1799 and 599, respectively. |
| PERCENT_CONTENT_VISIBLE | tinyint | Yes | Percent Content Visible records a percentage indicating how much of the Application content is visible. This can be used in the scoring algorithm to reduce the viewing points earned if the visible percentage is below a specified level. Also known as occluded region. |
| APP_STATE_OPEN_REASON_CODE | | | Datatype: varchar(10)<br>Nullable: Yes<br>Open: Reactivate after application suspension (for example, a suspension due to a commercial break).<br>Application State Open Reason Code records the reason associated with the application state.<br>Examples:<br>The Application is active and a commercial break appears which forces the application to suspend. The reason may be "Close App for Commercial Break".<br>The Application is active and user chooses picture in picture mode which forces the application to suspend. The reason may be "Close App Picture in Picture mode."<br>The Application is hidden because PIP mode is active. User closes PIP mode and application reappears. The reason may be "Show application upon closing PIP mode." |
| APP_STATE_CLOSE_REASON_CODE | | | Datatype: varchar(10)<br>Nullable: Yes<br>Close: Suspend the application so overlays do not appear during commercial break.<br>Examples:<br>Tune away. Viewer hits exit button. Emergency Alert System message must be displayed. Higher priority application appears (e.g., Caller ID, depending on application setting). Guide is invoked. A commercial break begins. An application is configured to suspend or not show any graphics when the user chooses Picture-in-picture mode on the TV. More generally, some applications may require full video with no scaling in order to be visible. |

VIEWING_DEVICE Entity
Video Viewing Device identifies any device, which a person may use to view video content.

| Name | Data Type | Nullable | Documentation |
|---|---|---|---|
| DEVICE_ID | int(10) | No | Video Viewing Device ID is the anonymized (de-identified) internal identifier assigned to this video viewing device. |
| DEVICE_DEF_ID | int(10) | No | Video Viewing Device Type Code identifies what kind of device this is. |
| DEVICE_GUID | varchar(32) | No | De-identified globally unique identifier for the device. |

DEVICE_HOUSEHOLD_VIEWER_MAP Entity
Device Household Viewer records the linkage between a Viewer, their House, and their Viewing Device.

| Name | Data Type | Nullable | Documentation |
|---|---|---|---|
| DEVICE_HOUSEHOLD_VIEWER_MAP_ID | int(10) | No | Device Household Viewer ID records the internal identifier assigned to this combination of Device - House - Viewer. |
| HOUSEHOLD_ID | int(10) | No | Household ID identifies the household and links to the Household table. |

-continued

| Name | Data Type | Nullable | Documentation |
|---|---|---|---|
| VIEWER_ID | int(10) | No | Viewer ID identifies the viewer and links to the Viewer table. |
| DEVICE_ID | int(10) | No | Unique identifier of the viewing device associated with the household and viewer. |

STATIC_SEGMENT Entity

Static Segment records the information that identifies which Video Asset aired during this Video Program Segment for the instance of the Video Program that aired at the time identified by Video Program Airing. This is static, as opposed to dynamic, because all viewers of this Video Program Airing will see the same content. If the Video Program Segment defines an ad break, this identifies the Video Asset (ad) that aired during the ad break. If the Video Program Segment defines a program part (such as part of a newscast), this identifies the Video Asset (e.g., National news) that aired during the segment. The length of the Video Program Segment must match the length of the Video Asset that is being assigned to that segment. Note that the Video Program Segment may contain either targeted or non-targeted content; this record is recording the details of the static (non-targeted) content. The dynamic content is recorded in table PROG_AIRING_SEG_ASSET_DYNAMIC. By comparing viewing results of the two kinds of content, the system is able to measure the effectiveness of the targeting as measured in viewing seconds earned.

| Name | Data Type | Nullable | Documentation |
|---|---|---|---|
| STATIC_SEGMENT_ID | bigint(20) | No | Unique identifier for the static segment. |
| PROGRAM_SEGMENT_ID | int(10) | No | Program Segment ID records the link to the parent Video Program Segment record. That record identifies the position within the Video Program at which this content was placed. |
| VIDEO_ASSET_ID | int(10) | No | Video Asset ID records the asset ID of the asset which aired during this program segment. In the case of an ad, this identifies the ad that aired. |
| AIRED_PROGRAM_ID | int(10) | No | Program Airing ID links to the parent Video Program Airing which identifies which airing of the video program this asset appeared in. |
| AD_PLACEMENT_ID | int(10) | Yes | Ad Placement ID provides the link to placement of the ad in relation to the advertising opportunity. |
| SAFI_CIP_AD_CAMPAIGN_ID | int(10) | No | The SAFI_CIP_AD_CAMPAIGN_ID records the campaign ID under which the ad was placed in the Static Segment. The same ad can be used in multiple campaigns. When we are tracking viewership of an ad, we need to know the campaign under which the ad was presented to the viewer. If we do not capture the campaign, then we will end up recording Households that viewed the ad, but it will be apart from the context of the campaign, which will not be useful for measuring campaign performance. |
| INTERACTIVE_APP_INSTANCE_ID | Datatype: int(10) Nullable: Yes | | Interactive Application Instance ID records the identifier of this interactive application instance. Example: The Video Program is a national sporting event such as the Rose Bowl. The Program airs say at 1:00 PM MST. We have multiple Video Program Segments defined. The Segments have Static content with Interactive App Instances that vary depending on your city (Press here for a call from your local Ford dealer). Note: This information does not control the measurement activity. Instead, it can be used to identify a possible reason for the viewing results. |

HOUSEHOLD_DEMOGRAPHIC Entity

Contains the demographics associated with the households viewing programs. This enables the generation of analytics and metrics based on specific traits.

| Name | Data Type | Nullable | Documentation |
|---|---|---|---|
| HOUSEHOLD_DEMOGRAPHICS_ID | int(10) | No | Household demographics ID is the unique internal identifier of this demographic. |
| HOUSEHOLD_ID | int(10) | No | Household identifier. |
| DEMO_CODE_ID | int(10) | No | Demographic associated with the household. |
| EFF_FROM_DATE | date | No | Contains the date from which this demographic code was assigned to this Household. |
| EFF_THRU_DATE | date | No | Contains the date through which this demographic code was assigned to this Household. |

DVR_RECORDING Entity
This entity records key information about the DVR recording.

| Name | Data Type | Nullable | Documentation |
|---|---|---|---|
| DVR_RECORDING_ID | bigint(20) | No | DVR Recording ID records the unique internal identifier assigned to this record. |
| AIRED_PROGRAM_ID | int(10) | No | Aired Program ID (Video Program Airing ID) provides a link to the specific Video Program Airing instance that was recorded. Since any Video Program could be aired one or more times (rerun, ads, etc.), we need to link to the actual content that was recorded. This will also provide the details about the airing such as date and time aired, channel, etc. |
| DEVICE_HOUSEHOLD_VIEWER_MAP_ID | int(10) | No | Device Household Viewer ID provides a link to the Device Household Device Viewer Mapping table which identifies the Device, Household, and Viewer associated with this recording. |
| STATION_ID | int(10) | No | Station ID points to the station_channel table as a foreign key reference. Provides link to call_sign, EIDR, etc. |
| TUNER_ID | tinyint | Yes | Device Tuner ID identifies the tuner used to create this recording. This is important to differentiate between multiple recordings that may be created at the same time from the same Household Device Viewer. |
| RECORDING_BEG_LOCAL_DT | datetime | No | Recording Begin Local Date Time records the date and time this recording began, in local time. The viewer may start the recording at the same time as the program or at any point during the program. Note: If the user sets the recording to begin before the actual start of the program, this value must reflect the actual program start time (not a few minutes before the program start time). |
| RECORDING_END_LOCAL_DT | datetime | No | Recording End Local Date Time records the date and time of when this recording ended, in local time. The viewer may end the recording at the same time as the program ends or at any point during the program. Note: If the user sets the recording to finish after the actual end of the program, this value must reflect the actual program end time (not a few minutes after the program end time). |
| RECORDING_BEG_UTC_DT | datetime | No | Recording Begin UTC Date Time records the date and time of when this recording began, in UTC time. The viewer may start the recording at the same time as the program or at any point during the program. Note: If the user sets the recording to begin before the actual start of the program, this value must reflect the actual program start time (not a few minutes before the program start time). |
| RECORDING_END_UTC_DT | datetime | No | Recording End UTC Date Time records the date and time of when this recording ended, in UTC time. The viewer may end the recording at the same time as the program ends or at any point during the program. Note: If the user sets the recording to finish after the actual end of the program, this value must reflect the actual program end time (not a few minutes after the program end time). |
| BEG_OFFSET_SEC_FROM_TRUE_BEG | Datatype: mediumint Nullable: No Beginning (Starting) Offset Second from True Beginning records the number of seconds into the program at which this recording began. Knowing this information, the program is able to normalize viewing across the recordings done by numerous devices. Example: If the recording began at the exact start of the actual program, then this would be zero. If the recording began at the start of the third minute, then this would be 120. The first two minutes of content would be in seconds 0 to 119. Value range is 0 to program duration in seconds (ex: 3599 for 1 hour program). Note: If the user sets the recording to begin recording before the actual start of the program, this value must reflect the actual program start second (not a few minutes before the program start time). | | |

| Name | Data Type | Nullable | Documentation |
|---|---|---|---|
| END_OFFSET_SEC_FROM_TRUE_BEG | | | Datatype: mediumint<br>Nullable: No<br>Ending Offset Second from True Beginning records the number of seconds into the program at which this recording ended.<br>Example:<br>If the recording ended at the exact end of the actual program, then this would be the number of seconds in the program, perhaps 1800 for a 30 minute program (60*30). If the recording ended exactly ten minutes into the program, then this would be 600 (60* 10). These values must be adjusted to account for starting the count at 0, so the values would be 1799 and 599 respectively. Value range is 0 to program duration in seconds (ex: 3599 for 1 hour program).<br>Note: If the user sets the recording to finish recording after the actual end of the program, this value must reflect the actual program end second (not a few minutes after the program end time). |
| INITIATION_CODE | smallint | No | Recording Type Code identifies how the recording was initiated.<br>Values include:<br>ONET = One Touch<br>SCHD = Scheduled. |
| TERMINATION_CODE | smallint | Yes | Recording Termination Code identifies how the recording was ended. Links to the Session Action Code table. |

LINEAR_VIEWING_SESSION Entity

Viewing Session records the details of the viewing session of a viewer associated with a house using a device. The session may be of the Linear content directly, in which case this record links to Video Program Airing as its parent.

| Name | Data Type | Nullable | Documentation |
|---|---|---|---|
| VIEWING_SESSION_ID | bigint(20) | No | Viewing Session ID records the unique internal identifier assigned to this record. |
| AIRED_PROGRAM_ID | int(10) | No | Aired Program ID provides a link to the specific Video Program Airing instance that was viewed. Since any Video Program could be aired one or more times (re-runs, etc., we need to link to the actual content that was viewed. This will also provide the details about the airing such as date and time aired, channel, etc. |
| DEVICE_HOUSEHOLD_VIEWER_MAP_ID | int(10) | No | Device Household Viewer ID provides a link to the Household Device Viewer table which identifies the Household, Viewer, and Device associated with this session. |
| GEO_AREA_CODE_ID | int(10) | Yes | Geographic area identifier in which the session began. |
| STATION_ID | int(10) | No | Station ID points to the station_channel table as a foreign key reference. Provides link to call_sign, EIDR, etc. |
| TUNER_ID | tinyint | No | Device Tuner ID identifies the tuner used during this session. This is important to differentiate between multiple sessions that may be created at the same time from the same Household Device Viewer. |
| SESSION_BEG_LOCAL_DT | datetime | No | Session Begin Local Date Time records the date and time of when this session began, expressed in local time. The viewer may start the viewing at the same time as the program or at any point during the program. |
| SESSION_END_LOCAL_DT | datetime | No | Session End UTC Date Time records the date and time of when this session ended, expressed in UTC time. |
| SESSION_BEG_UTC_DT | datetime | No | Session Begin UTC Date Time records the date and time of when this session began, expressed in UTC time. The viewer may start the viewing at the same time as the program or at any point during the program. |
| SESSION_END_UTC_DT | datetime | No | Session End UTC Date Time records the date and time of when this session ended, expressed in UTC time. |

-continued

| Name | Data Type | Nullable | Documentation |
|---|---|---|---|
| BEG_OFFSET_SEC_FROM_TRUE_BEG | mediumint | No | Beginning (Starting) Offset Second from True Beginning records the number of seconds into the program at which this session began. Knowing this information, we can normalize viewing across the sessions done by numerous devices. Example: If the session began at the exact start of the actual program, then this would be zero. If the session began at the start of the third minute, then this would be 120. The first two minutes of content would be in seconds 0 to 119. |
| END_OFFSET_SEC_FROM_TRUE_BEG | mediumint | No | Ending Offset Second from True Beginning records the number of seconds into the program at which this session ended. Example: If the session ended at the exact end of the actual program, then this would be the number of seconds in the program, perhaps 1800 for a 30-minute program. If the session ended exactly ten minutes into the program, then this would be 600. These values must be adjusted to account for starting the count at 0, so the values would be 1799 and 599, respectively. |
| INITIATION_CODE | smallint | No | Identifies what action initiated the session. Examples include, tune-in, timed start, long running session, etc. |
| TERMINATION_CODE | smallint | No | Reason code for a session terminating. Examples include Tune-out, end of program, end of recording session, etc. |

VOD_LEASE Entity
Contains the key information about the VOD Lease.

| Name | Data Type | Nullable | Documentation |
|---|---|---|---|
| VOD_LEASE_ID | bigint(20) | No | VOD Lease ID records the unique internal identifier assigned to this record. |
| VIDEO_PROGRAM_ID | int(10) | No | Contains the link to the leased video program. |
| DEVICE_HOUSEHOLD_VIEWER_MAP_ID | int(10) | No | Household Device Viewer ID provides a link to the DHV_Map (Device Household Viewer Mapping) table, which identifies the Household, Viewer, and Device associated with this recording. |
| LEASE_BEG_LOCAL_DT | datetime | No | Contains the beginning date time of the VOD lease in local time. |
| LEASE_END_LOCAL_DT | datetime | No | Contains the ending date time of the VOD lease in local time. |
| LEASE_BEG_UTC_DT | datetime | No | Contains the beginning date time of the VOD lease, expressed in UTC time. |
| LEASE_END_UTC_DT | datetime | No | Contains the ending date time of the VOD lease, expressed in UTC time. |

VIEWER Entity
Viewer record information about the person operating a video asset viewing device to view or record video content.

| Name | Data Type | Nullable | Documentation |
|---|---|---|---|
| VIEWER_ID | int(10) | No | Viewer ID is the unique internal identifier of this viewer. |
| VIEWER_GUID | varchar(32) | No | Viewer globally unique ID is the anonymized (de-identified) unique internal identifier of this video program. |
| VIEWER_TYPE | varchar(8) | No | Type of the viewer consuming the video content. |

AD_CAMPAIGN_TO_ASSET_MAP Entity
Provides the link between the video asset and associated advertising campaigns. Video assets can be associated with zero or many advertising campaigns.

| Name | Data Type | Nullable | Documentation |
|---|---|---|---|
| VIDEO_ASSET_ID | int(10) | No | Contains the link to the video asset. |
| SAFI_CIP_AD_CAMPAIGN_ID | int(10) | No | Contains the link to the associated advertising campaign. |

DEMOGRAPHIC_CODE Entity

Contains the list of demographics available for performing analytics.

| Name | Data Type | Nullable | Documentation |
|---|---|---|---|
| DEMO_CODE_ID | int(10) | No | Demographic type ID is the unique internal identifier of this demographic type. |
| DEMO_VALUE | varchar(32) | No | Actual associated value for the demographic type. For example, if the demographic is age range, this value could be "40-59". |
| DEMO_TYPE_ID | int(10) | No | Foreign key back to the demographic type. |
| DEMO_CODE_MNEMONIC | varchar(6) | Yes | This is a 6-character descriptor of the demographic code. This is for convenience for filtering and reporting. |

LINEAR_TUNING_ACTIVITY Entity

Linear Tuning Activity records the tuning event as it occurred, before breaking it into program chunks in the Linear Viewing Session record. Having the data in this format allows for Longitudinal Analytics that are very difficult to reproduce using the Session-level data because the sessions must be reassembled. For example, what program did the STB tune to before and after a program of interest.

| Name | Data Type | Nullable | Documentation |
|---|---|---|---|
| LINEAR_TUNING_ACTIVITY_ID | bigint(20) | No | Linear Tuning Activity ID is the unique identifier assigned to this record. |
| DEVICE_HOUSEHOLD_VIEWER_MAP_ID | int(10) | No | Device Household Viewer Map ID provides a link to the Household Device Viewer table, which identifies the Household, Viewer, and Device associated with this linear tuning activity. |
| STATION_ID | int(10) | No | Station ID points to the station_channel table as a foreign key reference. Provides link to call_sign, EIDR, etc. |
| TUNER_ID | tinyint | No | Device Tuner ID identifies the tuner used during this tuning activity. This is important to differentiate between multiple sessions that may be created at the same time from the same House Device Viewer. |
| TUNING_ACTIVITY_TYPE_CODE | varchar(3) | No | Tuning Activity Type Code identifies the type of this tuning activity:<br>LIN = Linear<br>DVR = Digital Video Recording<br>VOD = Video On Demand. |
| TUNE_IN_LOCAL_DT | | | Datatype: datetime<br>Nullable: No<br>Tune In Local Date Time records the date and time the viewing device (STB) tuned to the channel, in local time.<br>Examples:<br>A tune in may occur because the viewer tunes to the channel, because of a power on, or because of a DVR recording beginning. On a channel change, the tune out occurs in one second and the tune in occurs in the next second (they do not occur in the same second, because this would lead to double measuring of viewing during that second). |
| TUNE_OUT_LOCAL_DT | | | Datatype: datetime<br>Nullable: No<br>Tune Out Local Date Time records the date and time the viewing device (STB) tuned away from the channel, in local time. This records the last second that the device was tuned to the channel.<br>Examples:<br>A tune out may occur because the viewer tunes to another channel, because of a power off, or because of a DVR recording ending. When tuning to another channel, the tune out occurs in one second and the tune in during the next second (they do not occur in the same second, because this would lead to double measuring of viewing during that second). |
| TUNE_IN_UTC_DT | datetime | No | Tune In UTC Date Time records the date and time of when the viewing device (STB) tuned to the channel expressed in UTC time. Refer to TUNE_IN_LOCAL_DT for examples. |
| TUNE_OUT_UTC_DT | datetime | No | Tune Out UTC Date Time records the date and time of when the viewing device (STB) tuned away from the channel expressed in UTC time. This records the last second that the device was tuned to the channel. Refer to TUNE_OUT_LOCAL_DT for examples. |
| GEO_AREA_CODE_ID | int(10) | Yes | Geo Area Code ID is used when the Tuning Activity occurs in a different location than the geographic location associated with the Household, such as when the viewer is traveling with the device. This records only the location |

| Name | Data Type | Nullable | Documentation |
|---|---|---|---|
| | | | where the tuning activity began, not each location along the way. |
| INITIATION_CODE | smallint(6) | No | Initiation Code identifies how the tuning activity was initiated. Identifies what action initiated the session.<br>Examples include tune-in, timed start, long running session, etc. |
| TERMINATION_CODE | smallint | No | Termination Code identifies how the Tuning Activity was terminated. |

VOD_PLAYBACK_SESSION Entity
VOD Playback Session records information about the viewing session.

| Name | Data Type | Nullable | Documentation |
|---|---|---|---|
| VOD_PLAYBACK_SESSION_ID | bigint(20) | No | VOD Playback ID records the unique identifier of this VOD playback record. |
| VOD_LEASE_ID | bigint(20) | No | Contains the link to the VOD Lease. This ties the sessions to the lease. |
| GEO_AREA_CODE_ID | int(10) | Yes | Geographic Area Code ID is the link to the geographic area. |
| DEVICE_HOUSEHOLD_VIEWER_MAP_ID | int(10) | No | Household Device Viewer ID provides a link to the DHV_Map (Device Household Viewer Mapping) table, which identifies the Household, Viewer, and Device associated with this viewing. |
| PLAYBACK_BEG_LOCAL_DT | datetime | No | Playback Begin Datetime records the date and time of when the VOD playback began, in local time. |
| PLAYBACK_END_LOCAL_DT | datetime | No | Playback End Datetime records the date and time of when the VOD playback ended, in local time. |
| PLAYBACK_BEG_UTC_DT | datetime | No | Playback Begin UTC Datetime records the date and time of when the VOD playback began, in UTC time. |
| PLAYBACK_END_UTC_DT | datetime | No | Playback End UTC Datetime records the date and time of when the VOD playback ended, in UTC time. |
| INITIATION_CODE | smallint | No | Identifies what action initiated the session. Example: begin viewing VOD asset. |
| TERMINATION_CODE | smallint | No | Reason code for a session terminating. Example: end viewing VOD asset. |

ADVERTISING_CAMPAIGN Entity

| Name | Data Type | Nullable | Documentation |
|---|---|---|---|
| SAFI_CIP_AD_CAMPAIGN_ID | int(10) | No | The unique identifier of the Stewardship and Fulfillment Interface (SaFI) identifier. |
| CAMPAIGN_ | varchar | No | The full name of the |
| NAME | (250) | | advertising campaign. |

DVR_PLAYBACK_SESSION Entity
DVR Recording Playback Session records information about the viewing session.

| Name | Data Type | Nullable | Documentation |
|---|---|---|---|
| DVR_PLAYBACK_SESSION_ID | bigint(20) | No | DVR Recording Playback ID records the unique identifier of this DVR recording playback record. |
| DVR_RECORDING_ID | bigint(20) | No | DVR Recording ID provides a link to the DVR Recording table which identifies all the details about this recording, including the link to what was recorded and when. |
| GEO_AREA_CODE_ID | int(10) | Yes | Geographic Area Code ID is the link to the geographic area. |
| TUNER_ID | tinyint | No | Tuner ID records the Tuner used for playback. This may not be the same as the Tuner used for recording. |

-continued

| Name | Data Type | Nullable | Documentation |
|---|---|---|---|
| PLAYBACK_BEG_LOCAL_DT | datetime | No | Playback Begin Local Datetime records the date and time the DVR recording playback began, in local time. |
| PLAYBACK_END_LOCAL_DT | datetime | No | Playback End Local Datetime records the date and time the DVR recording playback ended, in local time. |
| PLAYBACK_BEG_UTC_DT | datetime | No | Playback Begin UTC Datetime records the date and time the DVR recording playback began, in UTC time. |
| PLAYBACK_END_UTC_DT | datetime | No | Playback End UTC Datetime records the date and time the DVR recording playback ended, in UTC time. |
| INITIATION_CODE | smallint | No | Identifies what action initiated the session. Examples include tune-in, timed start, long running session, etc. |
| TERMINATION_CODE | smallint | No | Reason code for a session terminating. Examples include tune-out, end of program, end of recording session, etc. |
| DEVICE_HOUSEHOLD_VIEWER_MAP_ID | int(10) | No | Device Household Viewer ID provides a link to the DHV_Map (Device Household Viewer Mapping) table, which identifies the Household, Viewer, and Device associated with this viewing. |
| AIRED_PROGRAM_ID | int(10) | Yes | Aired Program ID is copied forward from the parent record for convenience. |

DEMOGRAPHIC_TYPE Entity

Contains the lists of candidate statistical characteristics of a population.

| Name | Data Type | Nullable | Documentation |
|---|---|---|---|
| DEMO_TYPE_ID | int(10) | No | Unique identifier of the demographic type. |
| DEMO_TYPE | varchar(16) | No | Short name of the demographic types. Includes identifiers such as Gender, Age Range, Median Income, household ownership, mobility, etc. |
| DEMO_DESC | varchar(40) | No | The long description of the demographic. |
| DEMO_USAGE | varchar(128) | No | General note on the usage of the demographic. |
| DEMO_TYPE_MNEMONIC | varchar(6) | No | This is a 6-character descriptor of the demographic type. This is for convenience for filtering and reporting. |

VIEWER_DEMOGRAPHIC Entity

Contains the demographics associated with the viewer of the program. This enables the generation of analytics and metrics based on specific traits.

| Name | Data Type | Nullable | Documentation |
|---|---|---|---|
| VIEWER_DEMOGRAPHIC_ID | int(10) | No | The Viewer Demographic ID is the unique identifier assigned to this record. |
| VIEWER_ID | int(10) | No | Contains the viewer ID to be associated with the desired demographic. |
| DEMO_CODE_ID | int(10) | No | Contains the demographic identifier to be associated with the viewer. |

AD_PLACEMENT Entity

This entity associates the actual placements of video assets to the placement opportunities.

| Name | Data Type | Nullable | Documentation |
|---|---|---|---|
| AD_PLACEMENT_ID | int(10) | No | Unique identifier for the ad placement. |
| AD_PLACEMENT_OPPORTUNITY_ID | int(10) | No | Identifier that links the placement of the advertising to the placement opportunity. |

LINEAR_VIEWING_CONTROL Entity

Linear viewing control records details about the play.

| Name | Data Type | Nullable | Documentation |
|---|---|---|---|
| LINEAR_VIEWING_CONTROL_ID | bigint(20) | No | Linear viewing control ID records the unique identifier of this control action. |
| VIEWING_SESSION_ID | bigint(20) | No | Viewing session ID links the viewing control action to the viewing session. |
| VIEWING_MODE_CODE | varchar(2) | No | Viewing Mode Code records the mode or activity occurring during playback.<br>PL = Play<br>PA = Pause<br>F1 = Fast Forward 1x<br>F2 = Fast Forward 2x<br>R1 = Rewind 1x |

| Name | Data Type | Nullable | Documentation |
|---|---|---|---|
| VIEW_MODE_BEG_SEC_FROM_TRUE_BEG | mediumint | No | R2 = Rewind 2x (etc.) View Mode Beg Second From True Beginning (of Video Program) identifies the position in the actual content of where this activity occurred. So regardless of what part of the video the user is viewing, this identifies where in the content the viewer is causing this activity. Tracking the activity position in this manner allows the system to normalize measurement across all of the sessions from multiple viewers. |
| VIEW_MODE_END_SEC_FROM_TRUE_BEG | | | Datatype: mediumint Nullable: No View Mode End Second From True Beginning (of Video Program) identifies the position in the actual content (not simply the recorded part) of where the activity represented by this playback mode ended. So, regardless of what part of the recording the user recorded, this identifies where in the content the viewer is causing this activity. Tracking playback position in this manner allow the system to normalize measurement across all of the DVR playback occurrences from multiple viewers. Example: If the playback mode is F2 (fast forward 2x), this field identifies the ending point of where the F2 activity occurred in the actual content. This time could be of a finer granularity than one second if desired. Value range is 0 to program duration in seconds (ex: 3599 for a 1-hour program). |

SESSION_INITIATION_REF Entity

Contains the session initiation codes and descriptions.

| Name | Data Type | Nullable | Documentation |
|---|---|---|---|
| INITIATION_CODE | int(11) | No | Unique identifier for session termination actions. |
| INITIATION_NAME | varchar(16) | No | Short name associated with the session initiation actions. |
| INITIATION_DESC | varchar(255) | No | Long description of session initiation actions. |

AD_PLACEMENT_OPPORTUNITY Entity

This entity contains the links to the placement opportunities definitions. These definitions are externally defined.

| Name | Data Type | Nullable | Documentation |
|---|---|---|---|
| AD_PLACEMENT_OPPORTUNITY_ID | int(10) | No | Ad placement opportunity ID records the unique internal identifier assigned to this record. |

VOD_PLAYBACK_CONTROL Entity

VOD Recording Playback Control records details about the viewing of the VOD program.

| Name | Data Type | Nullable | Documentation |
|---|---|---|---|
| VOD_PLAYBACK_CONTROL_ID | bigint(20) | No | VOD Playback Session ID records the unique identifier of this VOD Recording Playback Session. |
| VOD_PLAYBACK_SESSION_ID | bigint(20) | No | VOD Playback ID links back to the parent VOD viewing record, which records the details about the playback of this VOD recording. |
| PLAYBACK_MODE_CODE | varchar(2) | No | Playback Mode Code records the mode or activity occurring during playback. PL = Play PA = Pause F1 = Fast Forward 1x F2 = Fast Forward 2x R1 = Rewind 1x R2 = Rewind 2x (etc.) |
| PB_MODE_BEG_SEC_FROM_TRUE_BEG | | | Datatype: mediumint Nullable: No Playback Mode Beg Second From True Beginning (of Video Program) identifies the position in the actual content (not simply the recorded part) where this activity occurred. So, regardless of what part of the recording the user recorded, this identifies where in the content the viewer is causing this activity. Tracking the activity position in this manner allows the system to normalize measurement across all of the |

| Name | Data Type | Null-able | Documentation |
|---|---|---|---|
| | | | DVR playback occurrences from multiple viewers.<br>Example:<br>If the playback mode is Play, this field identifies the beginning point of where the Play activity occurred in the actual content. This time could be of a finer granularity than one second if desired. Value range is 0 to program duration, in seconds (e.g., 3599 for a 1-hour program). |
| PB_MODE_<br>END_SEC_<br>FROM_<br>TRUE_BEG | | | Datatype: mediumint<br>Nullable: No<br>Playback Mode End Second From True Beginning (of Video Program) identifies the position in the actual content (not simply the recorded part) the activity represented by this playback mode ended. So, regardless of what part of the recording the user recorded, this identifies where in the content the viewer is causing this activity. Tracking playback position in this manner allows the system to normalize measurement across all of the DVR playback occurrences from multiple viewers.<br>Example:<br>If the playback mode is F2 (fast forward 2x), this field identifies the ending point of where the F2 activity occurred in the actual content. This time could be of a finer granularity than one second if desired. Value range is 0 to program duration, in seconds (e.g., 3599 for a 1-hour program). |

TUNING_PRESENTATION_STATE Entity
This captures the presentation state changes during the viewing session.

| Name | Data Type | Null-able | Documentation |
|---|---|---|---|
| TUNING_<br>PRESENTATION_<br>STATE_ID | bigint(20) | No | This captures the presentation state changes during the viewing session. |
| LINEAR_TUNING_<br>ACTIVITY_ID | bigint(20) | No | Linear Tuning Activity ID records the link to the parent Tuning Activity record. |
| ACTIVITY_EVENT_<br>BEG_LOCAL_DT | datetime | No | Activity Event Begin Local Date Time records the date and time of when the activity in this record began, expressed in local time. |
| ACTIVITY_EVENT_<br>END_LOCAL_DT | datetime | No | Activity Event End Local Date Time records the date and time of when the activity in this record ended, expressed in local time. |
| ACTIVITY_EVENT_<br>BEG_UTC_DT | datetime | No | Activity Event Begin Local Date Time records the date and time of when the activity in this record began, expressed in UTC time. |
| ACTIVITY_EVENT_<br>END_UTC_DT | datetime | No | Activity Event End Local Date Time records the date and time of when the activity in this record ended, expressed in UTC time. |
| VOLUME_LEVEL | tinyint | Yes | Volume Level records the volume during this period of time indicated by this record. |
| PERCENT_<br>CONTENT_<br>VISIBLE | tinyint | Yes | Percent Content Visible records the percentage of content of this tuning activity that was visible during this period of time indicated by this record.<br>Example: Content was 100% visible, or content was 70% visible. |
| IS_BACKGROUND_<br>IND | char(1) | Yes | Flag indicating if the event occurred in the background. |
| IS_RECORDING_<br>IND | char(1) | Yes | Foreground background Indicator records whether the video is in the foreground or background during the time shown on this record. |
| IS_PCTURE_IN_<br>PICTURE_IND | char(1) | Yes | Picture in Picture Indicator records whether the video is being viewed in picture in picture mode during the time shown on this record. |
| IS_CLOSED_<br>CAPTION_IND | char(1) | Yes | Closed Caption indicates whether the viewer is displaying closed captions.<br>Y = closed caption is on.<br>N = closed caption is off. |
| PERCENT_OF_<br>SCREEN_THIS_<br>VIDEO | tinyint | Yes | Percent of Screen this Video identifies the percentage of the screen that is consumed by this video. This is used when the screen allows multiple video feeds where all are 100% visible. This provides a measure of how much of the viewer's attention may be devoted to the video |

-continued

| Name | Data Type | Nullable | Documentation |
|---|---|---|---|
| | | | program being measured. Value range is 0 to 100. |

DVR_PLAYBACK_CONTROL Entity
DVR Recording Playback Control records details about the play.

| Name | Data Type | Nullable | Documentation |
|---|---|---|---|
| DVR_PLAYBACK_CONTROL_ID | bigint(20) | No | DVR Recording Playback Session ID records the unique identifier of this DVR Recording Playback Session. |
| DVR_PLAYBACK_SESSION_ID | bigint(20) | No | DVR Recording Playback ID links back to the parent DVR Recording Playback record which records the details about the playback of this DVR recording. |
| PLAYBACK_MODE_CODE | varchar(2) | No | Playback Mode Code records the mode or activity occurring during playback.<br>PL = Play<br>PA = Pause<br>F1 = Fast Forward 1x<br>F2 = Fast Forward 2x<br>R1 = Rewind 1x<br>R2 = Rewind 2x<br>ST = STOP<br>RS = Restart<br>DL = Delete<br>(etc.) |
| PB_MODE_BEG_SEC_FROM_TRUE_BEG | Datatype: mediumint<br>Nullable: No | | Playback Mode Beg Second From True Beginning (of Video Program) identifies the position in the actual content (not simply the recorded part) where this activity occurred. So, regardless of what part of the recording the user recorded, this identifies where in the content the viewer is causing this activity. Tracking the activity position in this manner allows the system to normalize measurement across all of the DVR playback occurrences from multiple viewers.<br>Example:<br>If the playback mode is Play, this field identifies the beginning point of where the Play activity occurred in the actual content. This time could be of a finer granularity than one second if desired. Value range is 0 to program duration, in seconds (e.g., 3599 for a 1-hour program). |
| PB_MODE_END_SEC_FROM_TRUE_BEG | Datatype: mediumint<br>Nullable: No | | Playback Mode End Second From True Beginning (of Video Program) identifies the position in the actual content (not simply the recorded part) where the activity represented by this playback mode ended. So, regardless of what part of the recording the user recorded, this identifies where in the content the viewer is causing this activity. Tracking playback position in this manner allows the system to normalize measurement across all of the DVR playback occurrences from multiple viewers.<br>Example:<br>If the playback mode is F2 (fast forward 2x), this field identifies the ending point of where the F2 activity occurred in the actual content. This time could be of a finer granularity than one second if desired. Value range is 0 to program duration, in seconds (e.g., 3599 for a 1-hour program). |

NON_TUNING_PRESENTATION_STATE Entity

| Name | Data Type | Nullable | Documentation |
|---|---|---|---|
| NON_TUNING_PRESENTATION_STATE_ID | bigint(20) | No | Unique identifier for the non-tuning Presentation State. |
| LINEAR_VIEWING_CONTROL_ID | bigint(20) | No | Provides the link to the controls table associated with linear viewing. |

-continued

| Name | Data Type | Nullable | Documentation |
|---|---|---|---|
| EVENT_BEG_SEC_FROM_TRUE_BEG | mediumint | No | Session Beg Second From True Beginning (of Video Program) identifies the position in the actual content where this activity occurred. So, regardless of what part of the video the user is viewing, this identifies where in the content the viewer is causing this activity. Tracking the activity position in this manner allows the system to normalize measurement across all of the sessions from multiple viewers. |
| EVENT_END_SEC_FROM_TRUE_BEG | mediumint | No | Session End Second From True Beginning (of Video Program) identifies the position in the actual content of where this activity occurred. So, regardless of what part of the video the user is viewing, this identifies the end point in the content where the viewer is causing this activity. Tracking the activity position in this manner allows the system to normalize measurement across all of the sessions from multiple viewers. |
| VOLUME_LEVEL | tinyint | Yes | Volume level records the volume at which this occurred. This can be used in the scoring algorithm to reduce the viewing points earned if the volume is below a specified level. 0 = Muted. |
| PERCENT_CONTENT_VISIBLE | tinyint | Yes | Percent Content Visible records a percentage indicating how much of the viewing content is visible. This can be used in the scoring algorithm to reduce the viewing points earned if the visible percentage is below a specified level. Also known as occluded region. |
| IS_BACKGROUND_IND | char(1) | Yes | Is_Background records whether the video is in the background (less visible). This can be used in the scoring algorithm to reduce the viewing points earned if the video is not visible because it is in the background. Y = Background N = Foreground |
| IS_RECORDING_IND | char(1) | Yes | Flag indicating if the event occurred during the recording session. |
| IS_PICTURE_IN_PICTURE_IND | char(1) | Yes | Flag indicating if the event occurred as part of picture in picture. |
| IS_CLOSED_CAPTION_IND | char(1) | Yes | Closed Caption indicates whether the viewer is displaying closed captions. Y = closed caption is on. N = closed caption is off. |
| PERCENT_OF_SCREEN_THIS_VIDEO | tinyint | Yes | Percent of Screen this Video identifies the percentage of the screen that is consumed by this video. This is used when the screen allows multiple video feeds where all are 100% visible. This provides a measure of how much of the viewer's attention may be devoted to the video program being measured. Value range is 0 to 100. |

SESSION_TERMINATION_REF Entity
Contains the session termination codes and descriptions.

| Name | Data Type | Nullable | Documentation |
|---|---|---|---|
| TERMINATION_CODE | int | No | Unique identifier for session termination actions. |
| TERMINATION_NAME | varchar (16) | No | Short name associated with the session termination actions. |
| TERMINATION_DESC | varchar (255) | No | Long description of session termination actions. |

VOD_PRESENTATION_STATE Entity
This captures the presentation state changes during the viewing session.

| Name | Data Type | Nullable | Documentation |
|---|---|---|---|
| VOD_PRESENTATION_STATE_ID | bigint(20) | No | Unique identifier for the non-tuning Presentation State. |

-continued

| Name | Data Type | Nullable | Documentation |
| --- | --- | --- | --- |
| VOD_PLAYBACK_CONTROL_ID | bigint(20) | No | VOD Playback control ID links to the parent VOD Playback Control record. |
| EVENT_BEG_SEC_FROM_TRUE_BEG | mediumint | No | Event Beg Second From True Beginning (of Video Program) identifies the position in the actual content this activity occurred. So, regardless of what part of the video the user is viewing, this identifies where in the content the viewer is causing this activity. Tracking the activity position in this manner allows the system to normalize measurement across all of the sessions from multiple viewers.<br>Value range is 0 to program duration, in seconds (e.g., 3599 for a 1-hour program). |
| EVENT_END_SEC_FROM_TRUE_BEG | mediumint | No | Event End Second From True Beginning (of Video Program) identifies the position in the actual content where this activity occurred. So, regardless of what part of the video the user is viewing, this identifies the end point in the content where the viewer is causing this activity. Tracking the activity position in this manner allows the system to normalize measurement across all of the sessions from multiple viewers.<br>Value range is 0 to program duration, in seconds (e.g., 3599 for a 1-hour program). |
| VOLUME_LEVEL | tinyint | Yes | Playback volume level records the volume at which this playback occurred. This can be used in the scoring algorithm to reduce the viewing points earned if the volume is below a specified level.<br>0 = Muted.<br>Value range is 0 to 100. |
| PERCENT_CONTENT_VISIBLE | tinyint | Yes | Playback Percent Content Visible records a percentage indicating how much of the viewing content is visible. This can be used in the scoring algorithm to reduce the viewing points earned if the visible percentage is below a specified level. Also known as occluded region.<br>Value range is 0 to 100. |
| IS_BACKGROUND_IND | char(1) | Yes | Is_Background records whether the video is in the background (less visible). This can be used in the scoring algorithm to reduce the viewing points earned if the video is not visible because it is in the background.<br>Y = Background<br>N = Foreground |
| IS_CLOSED_CAPTION_IND | char(1) | Yes | Closed Caption indicates whether the viewer is displaying closed captions.<br>Y = closed caption is on.<br>N = closed caption is off. |
| PERCENT_OF_SCREEN_THIS_VIDEO | tinyint | Yes | Percent of Screen this Video identifies the percentage of the screen that is consumed by this video. This is used when the screen allows multiple video feeds, where all are 100% visible. This provides a measure of how much of the viewer's attention may be devoted to the video program being measured.<br>Value range is 0 to 100. |
| IS_PICTURE_IN_PICTURE | char(1) | Yes | Picture in Picture indicator indicates whether the viewer is using picture in picture feature.<br>Y = Screen is in Picture in Picture Mode.<br>N = Screen is NOT in Picture in Picture Mode. |

DVR_PRESENTATION_STATE Entity
This captures the presentation state changes during the viewing session.

| Name | Data Type | Nullable | Documentation |
| --- | --- | --- | --- |
| DVR_PRESENTATION_STATE_ID | bigint(20) | No | DVR Presentation State ID is the unique identifier assigned to this DVR Presentation State record. |
| DVR_PLAYBACK_CONTROL_ID | bigint(20) | No | DVR Playback control ID links to the parent DVR Playback Control record. |

-continued

| Name | Data Type | Nullable | Documentation |
|---|---|---|---|
| EVENT_BEG_SEC_FROM_TRUE_BEG | mediumint | No | Event Beg Second From True Beginning (of Video Program) identifies the position in the actual content of where this activity occurred. So, regardless of what part of the video the user is viewing, this identifies where in the content the viewer is causing this activity. Tracking the activity position in this manner allows the system to normalize measurement across all of the sessions from multiple viewers. Value range is 0 to program duration, in seconds (e.g., 3599 for a 1-hour program). |
| EVENT_END_SEC_FROM_TRUE_BEG | mediumint | No | Event End Second From True Beginning (of Video Program) identifies the position in the actual content of where this activity occurred. So regardless of what part of the video the user is viewing, this identifies the end point in the content where the viewer is causing this activity. Tracking the activity position in this manner allows the system to normalize measurement across all of the sessions from multiple viewers. Value range is 0 to program duration, in seconds (ex: 3599 for 1-hour program). |
| VOLUME_LEVEL_NUM | tinyint | Yes | Playback volume level records the volume at which this playback occurred. This can be used in the scoring algorithm to reduce the viewing points earned if the volume is below a specified level. 0 = Muted. Value range is 0 to 100. |
| PERCENT_CONTENT_VISIBLE | tinyint | Yes | Playback Percent Content Visible records a percentage indicating how much of the viewing content is visible. This can be used in the scoring algorithm to reduce the viewing points earned if the visible percentage is below a specified level. Also known as occluded region. Value range is 0 to 100. |
| IS_BACKGROUND_IND | char(1) | Yes | Is_Background records whether the video is in the background (less visible). This can be used in the scoring algorithm to reduce the viewing points earned if the video is not visible because it is in the background. Values are: Y = Background; N = Foreground |
| IS_CLOSED_CAPTION_IND | char(1) | Yes | Closed Caption indicates whether the viewer is displaying closed captions. Y = closed caption is on, N = closed caption is off. |
| IS_PICTURE_IN_PICTURE_IND | char(1) | Yes | Picture in Picture indicator identifies whether the viewer is using picture in picture feature. Y = Screen is in Picture in Picture Mode N = Screen is NOT in Picture in Picture Mode |
| PERCENT_OF_SCREEN_THIS_VIDEO | tinyint | Yes | Percent of Screen this Video identifies the percentage of the screen that is consumed by this video. This is used when the screen allows multiple video feeds where all are 100% visible. This provides a measure of how much of the viewer's attention may be devoted to the video program being measured. Value range is 0 to 100. |

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for representing user engagement during playback of media comprising:
processing signaling generated when a user performs a sync event during playback of media, the sync event indicating a user performing an operation associated with redeeming a coupon for an advertisement shown during playback of the media;
generating a Media Event Data Model (MEDM) for the sync event based at least in part on information included in the processed signaling, including producing metadata included as part of the MEDM based on the processed data;
generating a Media Measurement Data Model (MMDM) for the sync event based at least in part on information included in the processed signaling, including producing metadata included as part of the MMDM based on the processed data;
applying a correlation process to the MEDM and the MMDM to generate a schema such that the schema includes metadata from each of the MEDM and MMDM represented as a plurality of electronically readable attributes indicative of user engagement proximate to the sync event;

independently of the processed signaling, receiving a redemption code from a vendor associated with the coupon, the redemption code being generated by the vendor in response to electronic receipt of the coupon;

electronically transmitting the schema to the vendor in response to electronic receipt of the redemption code, the schema enabling the vendor to assess user engagement proximate to redemption of the coupon and thereby quality of the advertisement;

receiving the processed signaling as content-sync upload data from a device used to playback the media, the user performing the operation for redeeming the coupon through manipulation of the device, the content-sync upload data including the following attributes: userid, deviceid, contented, contentcontext, mediatime, channel, eventtype and eventid; and automatically generating the MEDM and the MMDM based at least in part on the content-sync upload data such that the metadata associated therewith is based at least in part on settings and other electronically represented metrics of user interactivity with the device at least proximate in time to redemption of the coupon.

2. The method of claim 1 further comprising determining when the user performs the sync event solely from signals received from the device.

3. The method of claim 1 further comprising determining when the user performs the sync event based at least in part on signals received from a second screen application, the second screen application operating on a device other than the device playing the media to supplement playback of the media.

4. The method claim 1 further comprising generating the MEDM to include metadata representative of events occurring at the device proximate to the sync event, including metadata representing a Session Start Event, Session End Event, Play Control Event and Application State Event.

5. The method claim 1 further comprising generating the MMDM to include metadata representative of sessions occurring at the device proximate to the sync event, including metadata representing Linear Tuning Activity, Linear Viewing Session, DVR Playback Session, VOD Playback Session and Application Session.

6. The method of claim 1 further comprising generating the schema to include the following attributes: Customer.customerId, Resource.Physical Device, Aired_Program.EIDR_Content_Id, Linear_Tuning_Activity.Tuning_Activity_Type_Code, Linear_Viewing_Session.Beg_Offset_Sec_From_True_Beg, Linear_Viewing_Session.Station_Id or Linear_Tuning_Activity.Station_Id, Linear_Tuning_Activity.Initiation_Code and SegmentEvent.ContentID.

7. A system for representing user engagement during advertisements comprising:
a device for playing media to a user;
an event generator configured to generate signaling when a user performs a sync event during playback of media on the device, the sync event indicating an intention of a user to subsequently redeem a coupon associated with an advertisement shown during playback of the media, the system comprising:
a Media Event Data Model (MEDM) tool configured to process the signaling in order to generate metadata representative of events occurring at the device proximate to the sync event;
a Media Measurement Data Model (MMDM) tool configured to process the signaling in order to generate metadata representative of sessions occurring at the device proximate to the sync event;
a back office controller operable to generate a schema by correlating the MEDM with the MMDM, the schema including a plurality of electronically readable attributes representative of user engagement proximate to the sync event; and
wherein the back office controller generates the schema to include the following attributes: Customer.customerId, Resource.PhysicalDevice, Aired_Program.EIDR_Content_Id, Linear_Tuning_Activity.Tuning_Activity_Type_Code, Linear_Viewing_Session.Beg_Offset_Sec_From_True_Beg, Linear_Viewing_Session.Station_Id or Linear_Tuning_Activity.Station_Id, Linear_Tuning_Activity.Initiation_Code and SegmentEvent.ContentID.

8. The system of claim 7 wherein the back office controller includes a transmitter operable to electronically transmit the schema to a vendor associated with the coupon in response to receipt of a redemption code.

9. The system of claim 8 wherein the back office controller includes a receiver operable to receive the redemption code from a point-of-sale device.

10. The system of claim 7 wherein the MEDM tool and the MMDM tool generate the metadata at least based in part on a content sync upload, the content sync upload including the following attributes: userid, deviceid, contented, contentcontext, mediatime, channel, eventtype and eventid.

11. The system claim 7 wherein the MEDM tool generates metadata representing a Session Start Event, Session End Event, Play Control Event and Application State Event.

12. The system claim 7 wherein the MMDM tool generates metadata representing Linear Tuning Activity, Linear Viewing Session, DVR Playback Session, VOD Playback Session and Application Session.

13. A computer-readable medium having non-transitory instructions operable with a processor to facilitate generating a schema representative of user engagement when a user performs a sync event during playback of media on a device, the computer-readable medium comprising non-transitory instructions sufficient for:
generating a Media Event Data Model (MEDM) having metadata representative of events occurring at the device proximate to the sync event from signaling transmitted from the device;
generating a Media Measurement Data Model (MMDM) having metadata representative of sessions occurring at the device proximate to the sync event from signaling transmitted from the device;
generating the schema by correlating the MEDM with the MMDM according to a correlation algorithm, the schema including a plurality of electronically readable attributes representative of user engagement proximate to the sync event sufficient to provide a metrical presentation of the user engagement; and
generating the metadata included within the MEDM and the MMDM based in part on a content sync upload, the content sync upload including the following attributes: userid, deviceid, contented, contentcontext, mediatime, channel, eventtype and eventid.

14. The computer-readable medium of claim 13 further comprising non-transitory instructions sufficient for generating the MEDM to include metadata representing a Session Start Event, Session End Event, Play Control Event and Application State Event.

15. The computer-readable medium of claim 13 further comprising non-transitory instructions sufficient for generating the MMDM to include metadata representing Linear Tuning Activity, Linear Viewing Session, DVR Playback Session, VOD Playback Session and Application Session.

16. The computer-readable medium of claim 13 further comprising non-transitory instructions sufficient for generating the schema to include the following attributes: Customer.customerId, Resource.PhysicalDevice, Aired_Program.EIDR_Content_Id, Linear_Tuning_Activity.Tuning_Activity_Type_Code, Linear_Viewing_Session.Beg_Offset_Sec_From_True_Beg, Linear_Viewing_Session.Station_Id or Linear_Tuning_Activity.Station_Id, Linear_Tuning_Activity.Initiation_Code and SegmentEvent.ContentID.

\* \* \* \* \*